United States Patent [19]

Forgey et al.

[11] Patent Number: 4,511,919
[45] Date of Patent: Apr. 16, 1985

[54] METHOD AND APPARATUS FOR SCRAMBLING AND DESCRAMBLING VIDEO SIGNALS IN A MULTICHANNEL SYSTEM

[75] Inventors: James Forgey, Seattle, Wash.; Donald Kirk, Jr., Gainesville, Fla.

[73] Assignee: Hamlin International Corp., Seattle, Wash.

[21] Appl. No.: 326,441

[22] Filed: Dec. 1, 1981

[51] Int. Cl.³ .............................................. H04N 7/16
[52] U.S. Cl. .................................... 358/120; 358/117; 358/122
[58] Field of Search ............... 358/114, 117, 120, 122, 358/123

[56] References Cited

U.S. PATENT DOCUMENTS

| 4,068,264 | 1/1978 | Pires | 358/123 |
|---|---|---|---|
| 4,222,068 | 9/1980 | Thompson | 358/120 |
| 4,225,884 | 9/1980 | Block et al. | 358/124 |
| 4,319,273 | 3/1982 | Nossem | 358/120 |
| 4,338,628 | 7/1982 | Payne et al. | 358/120 |

*Primary Examiner*—S. C. Buczinski
*Attorney, Agent, or Firm*—William D. Hall

[57] ABSTRACT

A system for scrambling a video signal that includes a vertical blanking interval of equalizing pulses spaced at half line intervals followed by serrations which are, in turn, followed by equalizing pulses spaced at half-line intervals and thereafter by horizontal pulses spaced from each other at intervals of two half-lines each. The scrambling includes (a) providing an unsuppressed interval in each field which extends through the first horizontal sync pulse preceded by a two half-line space and (b) suppressing horizontal sync pulses occurring after the first horizontal sync pulse preceded by a two half-line space. Descrambling includes (a) producing a reference pulse from the unsuppressed pulses occurring during the unsuppressed interval in each field--the reference pulses occurring at the same relative time in each field; (b) dividing the time between reference pulses to provide timing pulses corresponding to the horizontal sync pulse period; and (c) generating a descramble wave for each timing pulse occurring outside the unsuppressed interval--each descramble wave being applied to a scrambled signal to amplify and being timed to correspond with a suppressed horizontal sync pulse. The unsuppressed horizontal sync pulse(s) are used in determining the phase of the field being descrambled. Selective descrambling of scrambled composite video signals is achieved by inserting a flag (or flags) between equalizing pulses in the vertical blanking intervals during scrambling. A correlation between an inserted flag and a corresponding memory element in the descrambler must be detected before the descrambler will amplify the horizontal sync pulses which were suppressed during scrambling. Circuitry for determining the phase of a given field based on the position of the unsuppressed horizontal sync pulses and circuitry for (1) preventing descrambling of unscrambled signals and (2) performing descrambling for properly scrambled signals are also provided. Relatively tamperproof descrambler memory programming is also provided.

3 Claims, 22 Drawing Figures

FIG. 3A
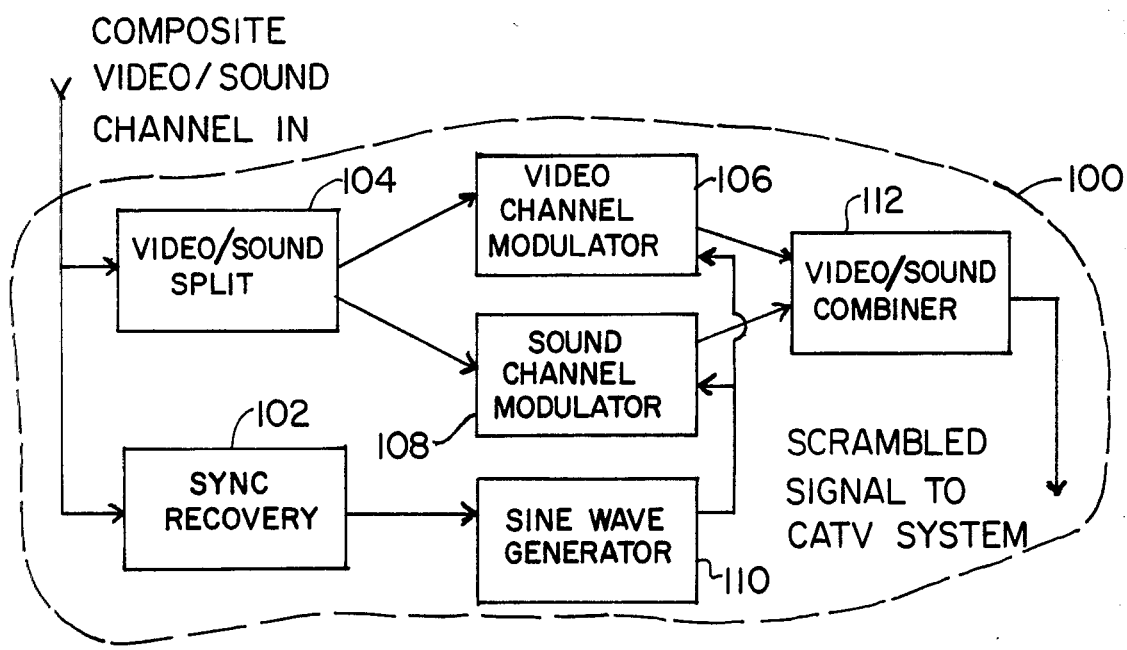
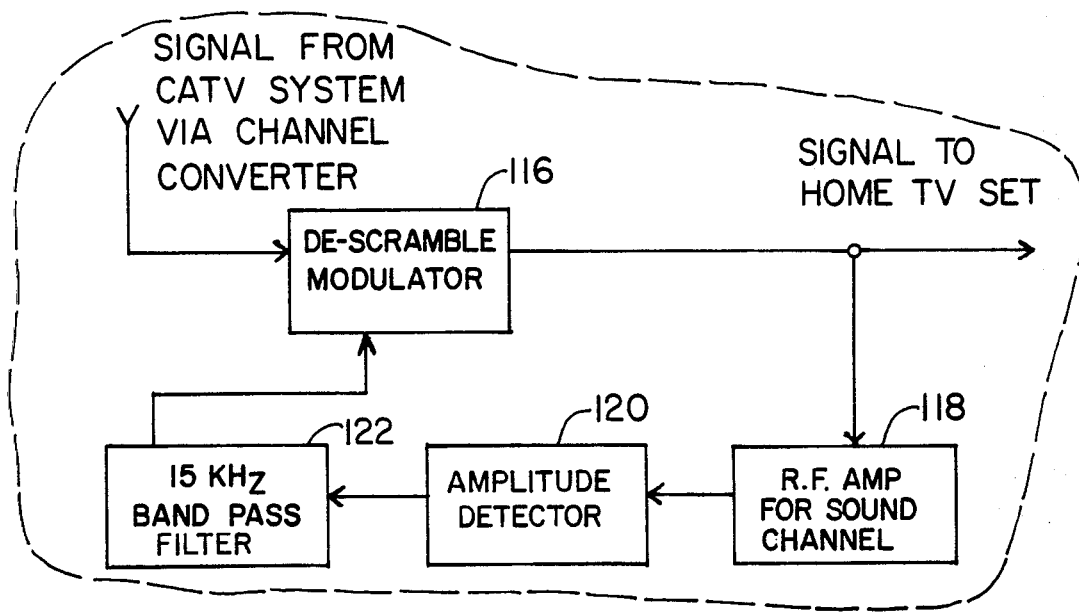

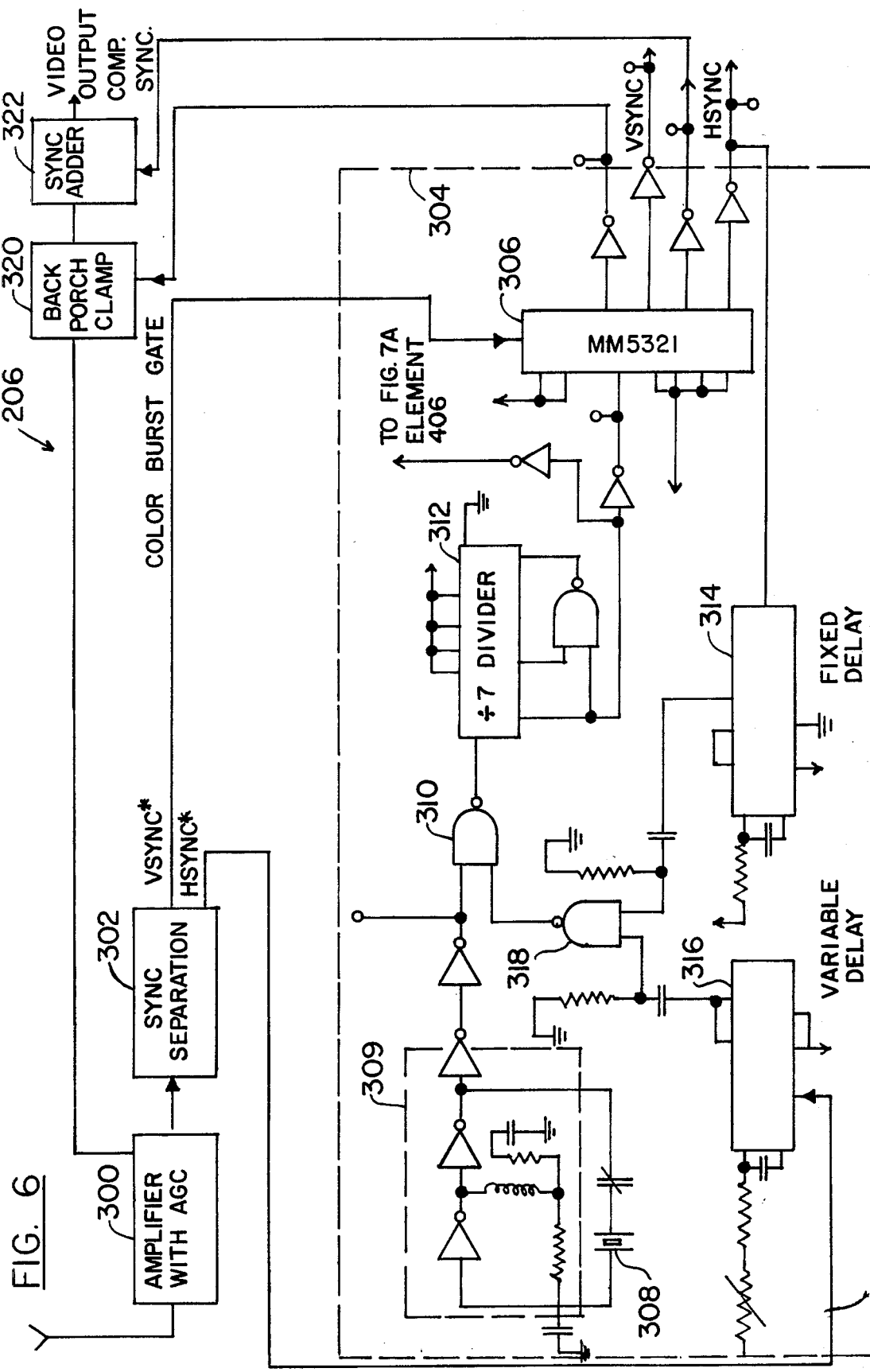

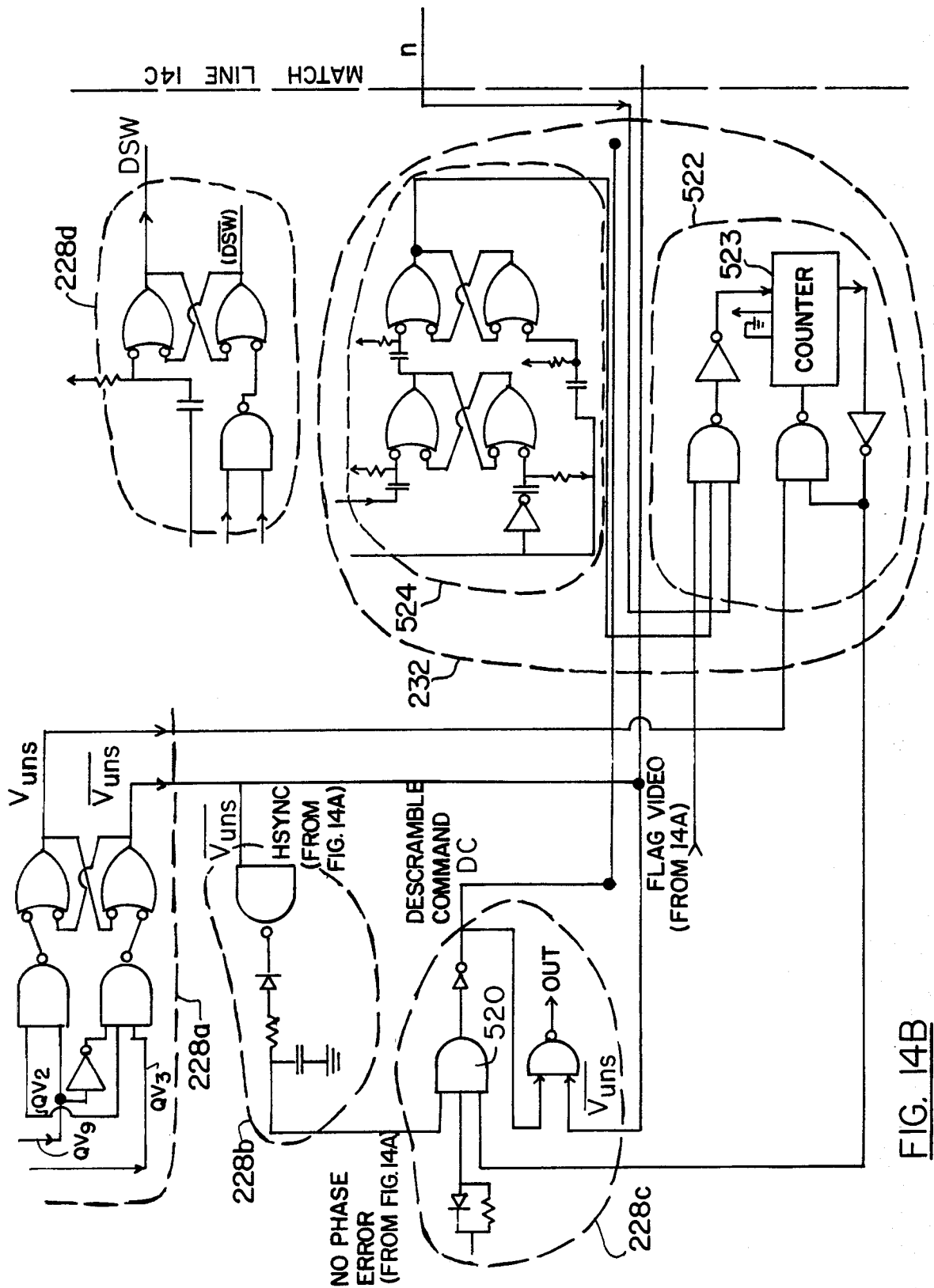

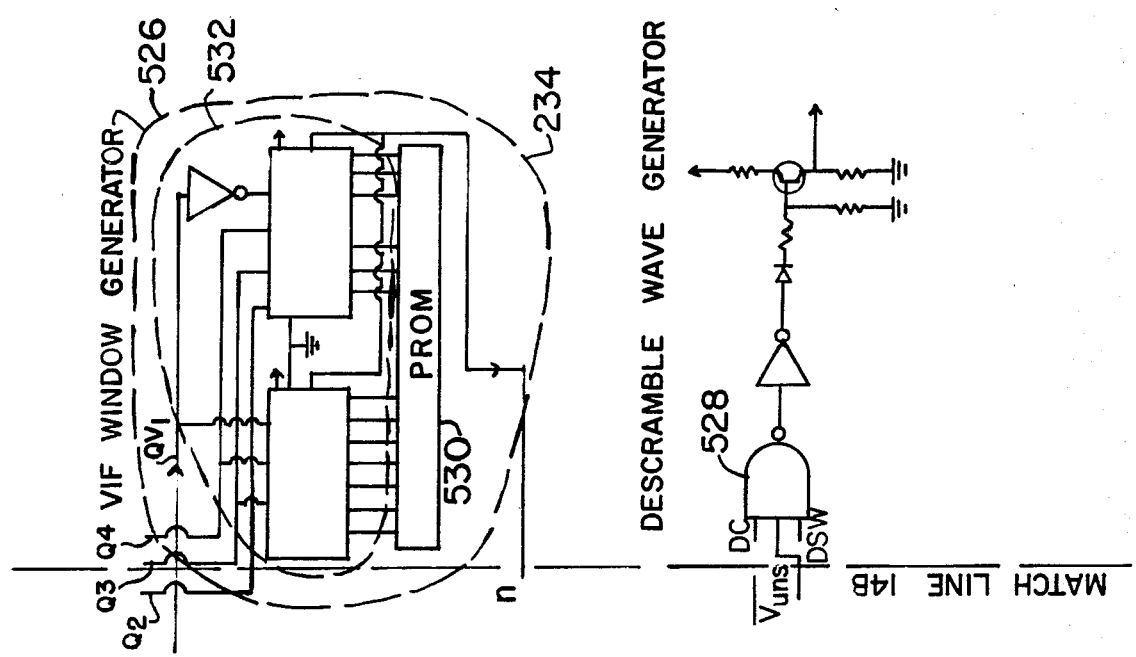

METHOD AND APPARATUS FOR SCRAMBLING AND DESCRAMBLING VIDEO SIGNALS IN A MULTICHANNEL SYSTEM

FIELD OF THE INVENTION

The present invention relates to the scrambling and descrambling of video transmissions. In particular, the invention relates to the scrambling of composite video signals (that is, signals including video information signals and synchronization pulses) in a multichannel television system. Descrambling is selective; only channels and/or categories of transmissions preprogrammed in a memory are descrambled.

BACKGROUND OF THE INVENTION

1. Conventional Television System

The conventional television broadcast system comprises a transmitting station for providing a composite video signal (which includes a video information signal with standard synchronization pulses), at least one receiver set for receiving the composite video signal, and a medium through which the composite video signal travels from the transmitting station to the receiver set. When the composite video signal comprises a radio wave, the medium is the air through which the radio wave propagates. When the composite video signal is transferred from the transmitting station to receiver set by an electrical signal, the medium may be a cable. Regardless of the medium, however, the transmitting station and receiver set provide similar respective functions.

The transmitting station includes a camera tube having a substantially rectangular raster onto which light from an object, the image of which is to be communicated, is reflected. The raster comprises a photoelectric surface which becomes positively charged as a function of the amount of light which strikes the raster. In order to convert the image on the raster to a signal which can be communicated, an electron beam scans the raster from one area, or element, to another. The scanning electron beam causes adjacent elements on the raster to totally discharge, the discharging of successive elements being directed onto a single line as a discharging current. The discharging current can be changed to RF form by modulating an RF carrier with the discharging current or can be maintained as an IF signal. In either case, the RF or IF signal represents a video information signal which, at any given instant, provides an indication of the amount of light striking (or discharge from) an element of the raster.

In order to effect the desired scanning of the camera tube raster by the electron beam, a horizontal sweep generator and a vertical sweep generator are provided. The horizontal sweep generator causes the electron beam to move in a substantially horizontal trace from the left edge of the raster to the right. Simultaneously, the vertical sweep generator causes the beam to move slowly downward along the raster. When the electron beam reaches the right edge of the raster, the electron beam is returned by a flywheel circuit to the left edge slightly below the line previously scanned. During this return or "retracing", the electron beam is switched off or blanked, no discharge of the raster occurring at that time. Similarly, following a vertical sweep, the electron beam is returned to the upper edge by a vertical retrace during which the electron beam is again blanked. As the electron beam moves from element to element, the amount of discharge of successive elements is indicated by the discharge current and the video information signal. As the beam scans from one element to another along successive horizontal lines, the video information signal provides an orderly, continuous representation of the amount of light striking the elements as the elements are discharged by the electron beam.

At the receiver set of the system is a picture tube having components similar to those of the camera tube at the transmitting station. However, unlike the camera tube which converts an optical image to a transmittable electrical or radio wave video information signal, the picture tube derives an optical image from the video information signal. The picture tube has a screen or raster onto which an electron beam is focused. The intensity of the electron beam is modulated by the video information signal. As the electron beam strikes an element of the picture tube raster, the element illuminates as a function of the intensity of the electron beam. In order to reproduce the camera tube image onto the picture tube raster, the electron beam of the picture tube must scan in a manner similar to the electron beam of the camera tube. That is, the two electron beams must scan the camera tube raster and the picture tube raster, respectively, in synchronism. A horizontal sweep generator and a vertical sweep generator are thus provided in the receiver set, in order to sweep the modulated electron beam across the picture tube raster in a sequence of horizontal scans corresponding to the horizontal scans of the electron beams of the camera tube.

Each scanning of all the distinct horizontal lines of a raster, to provide an instantaneous image, is referred to as a frame. Over the years, the frame has been separated into two interleaved fields. That is, the electron beams will first scan only the odd-numbered horizontal lines proceeding from the top of the raster to the bottom. The electron beams will then be returned to the top of the raster and will then scan only the even-numbered horizontal lines. In interleaving the two fields, it is customary for one of the fields to begin at the top of the raster midway across the horizontal length of the raster, the other field starting at the left edge of the raster. The field starting at the top with a horizontal half-line will terminate at the bottom of the raster at the right edge of the raster, while the field beginning at the left edge of the raster will terminate with a half-line extending from the left edge to the middle of the raster at the bottom of the field. Because of the half-line scanning of the top and of the bottom of the respective fileds, horizontal scans are often referred to in terms of half-lines. That is, instead of characterizing the United States standard as having 525 lines (less the retrace lines), the standard is often described as having 1,050 half-lines.

In order to synchronize the scanning of the electron beam in the picture tube with the electron beam in the camera tube, the transmitting station provides horizontal synchronization (sync) pulses and vertical synchronization (sync) pulses. The horizontal sync pulses are timed to occur at the end of each horizontal scan, while the vertical sync pulses are provided after the beam has reached the bottom of the raster and is in the process of retracing in the vertical direction. The frequency of the horizontal sync pulses and the vertical sync pulses may vary from one video system to another. In the United States and elsewhere in North America, the raster is scanned along 525 distinct horizontal lines (or 1,050 half-lines). Horizontal pulses in the United States are generated at 15,734 Hz with vertical sync pulses being generated at 59.94 Hz. The convention in England is 405 horizontal lines. The convention in Western Europe and Russia is 625 horizontal lines and the convention in France and Belgium is 819 horizontal lines. The horizontal and vertical sync pulses may vary accordingly, the general principles of synchronization still applying.

The horizontal and vertical sync pulses from the transmitting station are combined with the video information signals to form a composite video signal. It is this composite video signal which the conventional receiver set receives. A vital operation of the receiver set is, then, to separate the composite video signal into its components, so that the video information signal may be applied to modulate the electron beam of the picture tube and so that the sync pulses may be separately applied to the two sweep generators of the receiver set, respectively. In order to facilitate the stripping of the sync pulses from the video information signals, the horizontal and vertical sync pulses have amplitudes greater than the maximum possible video information signal amplitude. Generally, the maximum video information signal is 75% to 80% the amplitude of the sync pulses. As discussed below with reference to FIGS. 1 and 2, the separation of the composite video signal includes two steps: first, the stripping of both the horizontal and vertical sync pulses (and other related pulses) from the composite video signal and, second, the separating of horizontal sync pulses from vertical sync pulses.

The waveform of FIG. 1 is a composite video signal generated by modulating an RF carrier with the sync pulses and the video information signals emanating from the transmitting station. An examination of FIG. 1 shows that between times $t_1$ and $t_2$, times $t_4$ and $t_5$, and times $t_7$ and $t_8$, corresponding horizontal sync pulses are provided. The horizontal sync pulses are, as previously discussed, greater in magnitude than the maximum video information signal which can be transmitted. The portion of the waveform between times $t_2$ and $t_3$ (and also between times $t_5$ and $t_6$) is referred to as the back porch. Carried on the back porch is a signal burst which generally carries color information. Between times $t_3$ and $t_4$ (and also between times $t_6$ and $t_7$), a horizontal scan is effected. At time $t_3$, for example, the electron beam is at the left edge of the raster, the amplitude of the RF envelope at time $t_3$ corresponding to the level of discharge at the leftmost element on the raster. From time $t_3$ to time $t_4$, the electron beam scans across a horizontal line to the right edge of the raster. Between times $t_4$ and $t_6$, the electron beam returns to the left edge. At time $t_6$, the electron beam begins scanning a new line. Without the RF carrier applied to the wavefrom, an intermediate frequency (IF) signal is provided which shows only the modulations of the RF carrier and not the carrier itself. At no time is the video information signal amplitude more than 80% of the amplitude of the horizontal sync pulses. Although not shown, a number of pulses are provided at the end of a vertical sweep, these pulses being used to achieve vertical sweep synchronization. These pulses, like the horizontal sync pulses, are also of a magnitude which exceeds the maximum value of the video information signals. By employing conventional clipping circuitry, the receiver set can derive the various sync pulses from the composite video signal of FIG. 1 and can provide synchronization waveforms such as those shown in FIG. 2.

Referring to the upper waveform of FIG. 2, synchronization pulses relating to a first field are shown. The waveform immediately below shows synchronization pulses for a second field which, it should be evident, may be a continuation of the upper waveform. These two waveforms show three types of pulses of differing pulsewidth. First, horizontal sync pulses (at half-line times 18, 20, 22, 24, 544, 546 and 548) are shown having a narrow pulsewidth. These pulses occur during corresponding horizontal blanking intervals. Second, at the beginning and end of each vertical blanking interval, a number of very narrow pulsewidth equalizing pulses are provided at half-line times 0–5, 12–17, 525–530 and 537–542. Third, in the middle of each vertical blanking interval extending between half-line times 0–20 and 525–545 are pulses, each having a wide pulsewidth relative to the horizontal pulses and the equalizing pulses. The three types of pulses in the synchronization waveform are generally applied separately to a differentiation circuit which provides an output of positive and negative spike pulses and to an integration circuit used to provide a vertical sync output that occurs at a relatively constant time in each vertical blanking interval. That is, the integration circuit adds the successive vertical pulses and provides the vertical sync output when a predetermined sum is reached. In the conventional system, the vertical sync output, although occurring at a relatively constant time in each vertical blanking interval, does vary from frame to frame as the vertical pulses in a particular vertical blanking interval may vary in amplitude or duration. Such variations in the vertical sync output are generally of little significance in the conventional system, the vertical sync output providing an input to only a vertical flyback circuit.

In the early prior art, considerable technology has been generated with the aim of tying a transmitting station to one or a plurality of receiver sets and of synchronizing the sweeping of electron beams in the camera tube and picture tube, respectively. For many years in the past, the prior technology has emphasized the importance of synchronization. The prior technology has also been concerned with the separation of vertical and horizontal synchronization pulses from a composite video signal. In sum, the prior art has for the most part been directed to linking a receiver set with a transmitting station and assuring that the transmitting station and receiver set are continuously synchronized.

2. Television Communication Scrambling and Descrambling Systems

With the relatively recent introduction of pay cable television to the video communication industry, a new consideration has arisen. Where reception of certain programs or channels is intended to be limited to only paid subscribers, the question of how to limit rather than assure access to video transmissions has become significant. In addressing this concern, different systems have evolved.

In one contemplated system shown in FIG. 3A, a composite video/sound signal is scrambled at a head end scrambler 100. The composite video/sound signal enters a sync recovery element 102 and a video/sound split element 104. The video/sound split element 104 separates video signals from audio signals and directs them into a video channel modulator 106 and a sound channel modulator 108, respectively. A sine wave generator 110 connected to the sync recovery element 102 produces a sine wave of the same frequency as the horizontal sweep rate and of a phase which gives maximum attenuation at the peak of the horizontal sync pulse. The sine wave is applied to both the video channel modulator 106 and the sound channel modulator 108, applying the sine wave to both the video and audio portions of the composite signal. The video signal and audio signal then enter a combiner 112, the output from which is conveyed by an appropriate medium to the input of a descrambler 114. The descrambler 114 includes a descrambler modulator 116 into which the scrambled signal from the head end scrambler 100 enters. The descramble modulator 116 reverses the process of signal modification undergone in the head end scrambler 100. The output of the descramble modulator 116 enters an RF amplifier for the sound channel 118 which provides an amplified audio signal to an amplitude detector 120. The modulating function necessary to achieve the descrambling is provided by the amplitude detector 120 which operates on the carrier of the FM sound channel. The output of the amplitude detector 120 enters a band pass filter 122, the output from which provides a modulating input for the descramble modulator 116. A receiver set equipped with a descrambler 114 would receive a descrambled intelligible signal. A receiver set without a descrambler 114 would receive a scrambled, meaningless signal.

In this first known system, it should be noted that in normal practice, the FM sound channel is transmitted at a reduced amplitude. This is done to reduce system loading and to reduce interference with the next higher adjacent video channel. If the sound channel is now required to transmit the scramble information as amplitude modulation, there is a strong temptation to increase the average amplitude of the sound channel to make it easier to distinguish from the side bands of the next higher adjacent video channel. However, increasing the average amplitude would result in the loss of the advantage of low level transmission. In this regard, it has been found that the use of sine wave amplitude modulation of the FM sound carrier, when the sound carrier was provided without the usual reduction in amplitude, resulted in an unaccepted level of interference with the upper adjacent video channel. Also, with sine wave modulation, the linearity of modulation becomes a factor that must be considered. Further, it should be noted that the sine wave system, in providing attenuation for scrambling, also reduces the signal level at both sides of the picture. Increase in signal level might thus also be required in order to offset this effect. A proposed alternative to the sine wave modulation of the sound carrier includes the pulse amplitude modulation (PAM) of the FM sound carrier. In practice, however, the PAM embodiment has been found to be too critical as to signal level. Disadvantages in both the sine wave and the PAM embodiments of this type of system have, in sum, been recognized.

A second suggested system is shown in FIG. 3B. This system referred to as rectangular wave pilot signal scrambler and descrambler system includes a head end scrambler 124 into which the conventional composite video signal, of either RF or IF form, is provided as input. The composite video signal simultaneously enters a sync recovery element 126 and an amplitude modulator 128. The sync recover element 126 is connected to a rectangular wave generator 130 which has a frequency equal to the horizontal sweep rate and has a phase and shape which corresponds to the horizontal blanking interval of the composite video signal. The output of the rectangular wave generator 130 serves as a modulating function for the amplitude modulator 128. The rectangular wave serves to attenuate the composite video signal only during the horizontal blanking intervals of the composite video signal. In accordance with this second system, the video information conveyed by the composite video signal is not altered, but the horizontal sync pulses are suppressed. The output of the rectangular wave generator 130 also switches a modulated pilot generator 132 which selectively applies a pilot signal, which is either FM or AM controlled, to the composite video signal during each rectangular wave. The output of the amplitude modulator 128 and the pilot signal from the modulated pilot generator 132 are combined to form a scrambled signal which, through an appropriate medium, is transmitted. When received by a conventional receiver set, the transmission would be unintelligible, the sync pulses of the transmitted signal being suppressed. When directed to a receiver set equipt with a descrambler 134, the transmission is descrambled. That is, the scrambled signal enters a pilot signal band pass filter 136 and a multichannel converter 138 simultaneously. The pilot signal is extracted from the scrambled signal by means of the band pass filter 136 the output of which enters a pilot receiver demodulator 140. The output of the pilot receiver demodulator 140 enters a rectangular wave generator 142 to produce an output comparable to that of the rectangular wave generator 130 in the head end scrambler 124. The rectangular wave output from the rectangular wave generator 142 provides a modulating signal to a descramble modulator 144. The descramble modulator 144 also receives input from the multichannel converter 138 which provides channel selection when more than one channel is scrambled. When a plurality of scrambled channels are provided, one pilot signal per scrambled channel may be used, or, if the signals are available on a common sync basis, then the same pilot signal may be used to descramble all of the channels. Access to different channels can be controlled, in principle, by control of which pilot channels can be received by a particular subscriber. The necessity of transmitting a number of pilot signals in a multichannel arrangement, however, imposes additional burdens on the transmission system, especially where the transmission medium is cable. In addition, circuitry must be provided at the descrambler 134 for separating and detecting the particular pilot signal. Such circuitry would necessarily be interrelated with the multichannel converter 138 which would further complicate the system. Thus, while achieving the end of scrambling a transmission so that only receiver sets equipt with appropriate descrambling equipment can derive a meaningful signal therefrom, this second system features various limitations and burdens which render this system less than optimal. Thus, although the rectangular wave pilot signal system can provide a plurality of scramble channels, the system does not provide for the identification of certain program categories which may be carried on one or a plurality of channels and received by selected receiver sets.

Another technique is set forth is U.S. Pat. No. 3,191,462 to Hartung et al. In the Hartung et al apparatus, the video information signal of a composite video signal is selectively inverted. The effect of this inversion is to reverse the black and white portions of a black and white picture or invert the color spectrum of a color picture. Various embodiments are suggested wherein different patterns of video inversion may be applied.

The Hartung et al apparatus also provides for the insertion of pulse codes between horizontal pulses in the vertical blanking interval. The pulse coding is controlled by a computer at the transmitting station. According to this prior apparatus, the subscriber calls the computer to select programs which the subscriber's receiver set will thereafter be able to unscramble. Specifically, the pulse codes are negative pulses of varying duration located between horizontal sync pulses in the vertical blanking intervals. The pulse codes include receiver set identifiers and control signals. That is, each receiver set has an identification code which must match the identifier on the pulse code before the receiver set will descramble. The control signals correspond to a scrambling mode applied to the video information signal. The pulse codes thus provide (1) a receiver set identifier or address and (2) scrambling mode information which affects how the unscrambler performs unscrambling. The Hartung et al technique, it should be noted, however, includes various features which may not be desirable. First, the video information signal is being inverted and restored. Noise or variations in the inversion or restoration circuitry will directly affect the amplitude-dependent picture. Further, although providing a disturbing effect (like the negative of a photograph), a nonsubscribing viewer may still have impaired access to the image in those Hartung et al embodiments where all lines are inverted. Second, because the Hartung et al apparatus provides various "modes" of picture inversion scrambling (via the control signals of the pulse codes), the unscrambler must be capable of unscrambling in various modes. The unscrambler thus becomes more elaborate. Third, column 7, line 30 of U.S. Pat. No 3,919,462 indicates a limit on how many unscramblers may be addressed at a particular time. This limitation may be attributed to the Hartung et al transmitter-oriented coding concept wherein the transmitting station, by including identifiers in the transmission, determines which receiver sets are to be addressed. Hartung et al does not permit the receiver sets to "select" which scrambled transmissions are to be unscrambled. With the former Hartung et al concept, the dissemination of transmissions may be limited (even though an "all call" identifier may be provided) whereas the latter concept (employed by the present invention) permits the transmitting station to communicate with any or all receiver sets on a single line, the receiver sets being preprogrammed to descramble only certain channels or categories of transmissions. Further, with the prior system, a subscriber may have to wait several minutes before the computers recognizes him and, should the subscriber switch channels, he may again be forced to wait.

Finally, in the prior technology, there are various scrambling systems which employ video memory. Such systems perform complicated scrambling functions by interchanging picture elements. Such systems, however, are notably costly, requiring fairly sophisticated equipment at both the transmitter and receiver ends.

SUMMARY OF THE INVENTION

In order to overcome the disadvantages and limitations of the prior art, the present invention provides a novel apparatus for scrambling and descrambling a composite video signal.

The present invention provides a scrambler which in each frame suppressess all horizontal sync pulses following the first horizontal sync pulse preceded by a two half-line space. The present invention does not attenuate the video information signal or the pulses occurring within the vertical blanking interval. Unlike prior systems, the present invention does not require a separate pilot signal in order to recover the attenuated horizontal sync pulses. Rather, the present invention utilizes the unattenuated pulses occurring during the vertical blanking interval in order to recover the horizontal sync pulses from the scrambled signal and in order to derive all the various timing signals required for synchronization at the receiver set. That is, instead of generating a new additional "pilot" signal, the present invention uses the unaltered portions of the composite video signal to effect synchronization.

In order to achieve this object of recovering horizontal sync pulses without the use of a pilot signal, the present invention includes receiver set means whereby a reference pulse is derived from the unattenuated vertical pulses occurring during each vertical blanking interval, each such reference pulse being generated at precisely the same relative time during each vertical blanking interval. The reference pulses provide input to a phase locked loop which comprises (1) an oscillator, (2) means for matching the phase of the oscillator with the reference pulses and (3) means for dividing the output of the oscillator to provide the necessary timing pulses for synchronization. In generating the reference pulse, it should be noted that, because the reference pulse is used as the basis for timing receiver set horizontal sync pulses, the precision of the reference pulses is significant. Thus, while vertical sync outputs from the integration circuit (as described previously in the BACKGROUND OF THE INVENTION) may be used as reference pulses in other applications, the employment of the reference pulses to derive receiver set timing requires the use of a more sophisticated circuit. Accordingly, the present invention provides circuitry whereby all pulses during the vertical blanking interval are separately differentiated and integrated. Gating means are also provided whereby a reference pulse is produced in response to the first pulse output from the differentiating circuit after the integrating circuit exceeds a fixed threshold. This arrangement enhances the phase stability of the reference pulse and reduces the effect of noise introduced in the transmission path and variations in the video waveform which may effect the level of the integrator at any given time. By providing this circuitry, the present invention avoids errors in time reference which could cause several microseconds of jitter in the recovered timing signal. In addition, variations in the amplitude of the vertical pulses can be ignored, the reference pulse not being solely dependent on the voltage level of the integrator.

Based on the reference pulses, the divider of the phase locked loop provides a first output which is at a frequency and at a phase which corresponds to the frequency and phase of the horizontal sync pulses. This first divider output, however, runs continuously during and outside of the vertical blanking interval. In order to derive signals from this first divider output which correspond to only horizontal sync pulses outside the vertical blanking interval, i.e. those horizontal sync pulses which must be recovered, gating means are provided with the first dividing means, to indicate times outside the vertical blanking interval.

Further, in order to make certain that signals which are not scrambled do not undergo a descrambling process, the present invention includes circuitry whereby descrambling is permitted only when it is determined that (1) the reference pulses are locked into the phase locked loop, (2) there are no unattenuated horizontal sync pulses after the first horizontal sync pulse preceded by a two half-line space, and (3) a descrambling command is provided during a descrambling window which brackets the horizontal sync pulse. In this regard, it should also be noted that in scrambling the original composite video signal, a rectangular wave is generated during a scramble window which brackets, i.e. extends beyond and for the duration of the horizontal sync pulse. In accordance with the invention the descramble window is, preferably, slightly smaller than the scramble window and can be adjusted in phase as required.

In addition to deriving from the unattenuated vertical pulses the time intervals during which attenuated horizontal sync pulses should be amplified, the present invention also provides means for descrambling only selected types of video transmissions or only transmissions on selected channels of a multichannel system. In achieving this object, the present invention provides for the insertion of identification flags in selected slots between the equalizing pulses in the vertical blanking interval. As previously indicated, none of the pulses in the vertical blanking interval are attenuated. Thus, while the vertical pulses are used in deriving the reference pulses, the spaces between the equalizing pulses are used to insert flags indicating (1) type or category of television program or transmission and/or (2) scrambled video channel. In the conventional television video transmission, there are six equalizing pulses before the six equalizing pulses after the vertical pulses in the vertical blanking interval. The equalizing pulses, as previously mentioned, have somewhat narrow pulsewidths, adjacent equalizing pulses having a considerable space therebetween. The present invention includes the insertion of flag pulses in the spaces between the equalizing pulses. By using four adjacent equalizing pulses and by dividing the spacing between each two equalizing pulses into thirds, twelve time slots into which identification flag pulses can be inserted are provided. It is thus contemplated by the invention that one flag or a combination of flags may be inserted into the time slots over a given period. In the descrambler, means for detecting which, if any, flags have been inserted is provided. In particular, circuitry is provided which, first, indicates the intervals during which flags may be present and which, second, compares flag pulses inserted into a defined slot with a corresponding element in a memory in the descrambler in order to determine if the inserted flag matched to a preprogrammed entry in such element.

In accordance with the present invention, then, a high degree of flexibility can be realized. For example, available programming could be divided into twelve categories, each of the categories being assigned one of the twelve identification flags. The flags could be assigned by quality as well as by type of programming. That is, one flag could correspond to "lower quality sports programming", another flag could correspond to "higher quality movies", and so on. At the scrambler, a given transmission may incorporate more than one flag. For example, a sports-oriented movie could carry one flag indicating "sports" and a second flag indicating "movie", such that a descrambler programmed to accept either category of programming could descramble the scrambled composite video signal. In ordering a descrambler, the subscriber could choose the categories of television programming he is interested in receiving.

Any number of channels may be run with the same flag at the same time and the subject content of the flags in use on any channel may be changed as desired. That is, a flag which, in the morning, corresponds to "premium children's programming" may, in the evening, be shifted to "sports programming."

It should, at this point, be noted that the insertion of flags between equalizing pulses does not affect the operation of the receiver set which eventually receives the restored composite video signal with the flags inserted. Although the equalizing pulses are used in order to keep the horizontal sweep generator of the receiver set in step with the horizontal sweep generator at the transmitting station during the vertical retrace, the insertion of the flag pulses should not effect this process in the vast majority of receiver sets currently available.

In this regard, it should be noted that the vertical retrace does not comprise a single line but a series of connected diagonal lines moving upward from the lowermost portion of the raster at the end of each field. The equalizing pulses are provided in order that the horizontal sweep generator of the receiver set and the horizontal sweep generator at the transmitting station are kept in synchronization during the vertical retrace. Although many years ago, the horizontal sweeping included a line-by-line process, which was responsive to each detected equalizing pulse, horizontal sweeping is currently performed by a phase locked loop circuit which is affected only by time average of the horizontal sync pulses properly positioned within the vertical blanking interval. The flag pulses are not misread as equalizing pulses and do not adversely affect reception.

In accordance with the present invention, it is an object to provide a scrambling system which uses no pilot signal of any kind. More specifically, it is an object of the present invention to recover synchronization from the scrambled signal itself.

It is another object of the invention to identify categories of transmissions as well as individual channels, by means of inserting flag pulses between equalizing pulses provided during the vertical blanking interval of a composite video signal. In this regard, it is a complementary object of the invention to provide a descrambler which selectively descrambles only those scrambled signals which it is programmed to descramble.

It is also an object of the invention to permit the system to operate in the presence of noise in the transmission channel. This object is realized by including circuitry for preventing the descrambling of signals which are not originally scrambled and permitting descrambling only when there is a proper timing reference pulse.

It is also another object of the present invention to provide a signal format and apparatus for providing scrambling and descrambling without the necessity of increasing the average power of the signal transmitted.

It is a further object of the invention to provide a descrambler capable of descrambling a composite video signal which is scrambled by suppressing at least some of the horizontal sync pulses occurring after the first horizontal sync pulse preceded by a two half-line space of the composite video signal.

It is yet a further object of the invention to provide a descrambler which recovers attenuated horizontal sync pulses, which occur after the first horizontal sync pulse preceded by a two half-line space of a composite video signal by using unattenuated vertical pulses in each vertical blanking interval to derive the timing of the attenuated horizontal sync pulses.

It is still yet an object of the invention to (1) scramble a composite video signal by suppressing sync pulses outside the vertical blanking interval of a composite video signal; (2) insert flag pulses between adjacent unattenuated equalizing pulses in a composite video signal; and (3) derive the timing of the attenuated horizontal sync pulses and the temporal position of inserted flag pulses from reference pulses generated from unattenuated vertical pulses occurring during each vertical blanking interval.

It is still yet another object of the invention to provide simple, secure, relatively low power scrambling and descrambling of a composite video signal for a television broadcast system or other such field-scanning system. Because the present invention does not require the application of a pilot signal to a sound channel, as with prior art systems, the present invention may be used in a communication system which conveys only a picture without sound.

It is still yet a further object that the scrambling and descrambling method of the invention be applicable to various video communication systems, regardless (within reasonable limits) of the number of horizontal scan lines per frame, the sweep frequencies of the electron beam, the number of channels to be scrambled, and other such quantitative system characteristics.

BRIEF DESCRIPTION OF THE DRAWINGS

FIGS. 3A and 3B show block diagrams of prior art systems.

FIG. 6 is a detailed diagram of the horizontal and vertical sync recovery element (206) of the scrambler (200) shown in FIG. 5.

FIG. 9 is comprised of FIGS. 9A and 9B with connections shown by lower case letters.

DESCRIPTION OF THE INVENTION

1. General System Description

Figure 1:
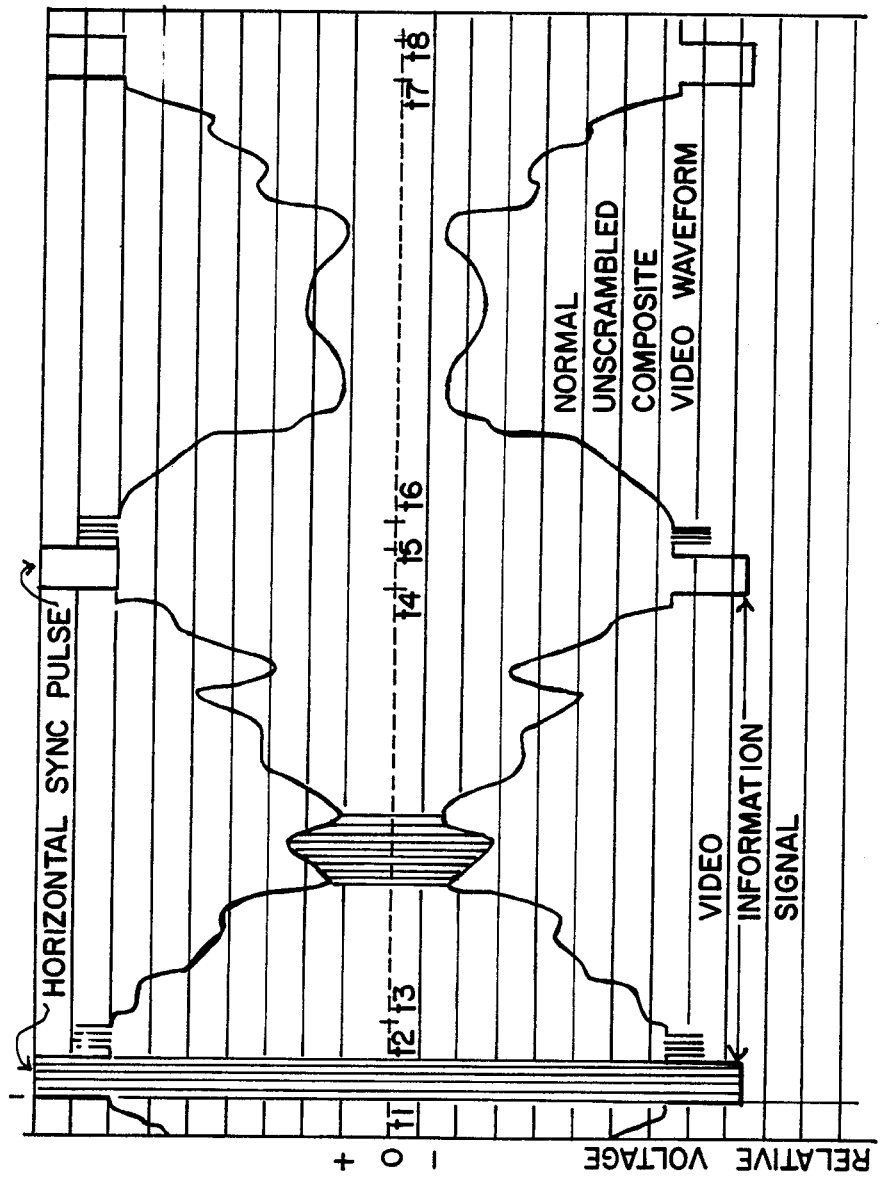
FIG. 1 illustrates a normal, unscrambled composite video signal waveform, showing an RF video information signal interrupted by horizontal synchronization pulses.
Figure 4:
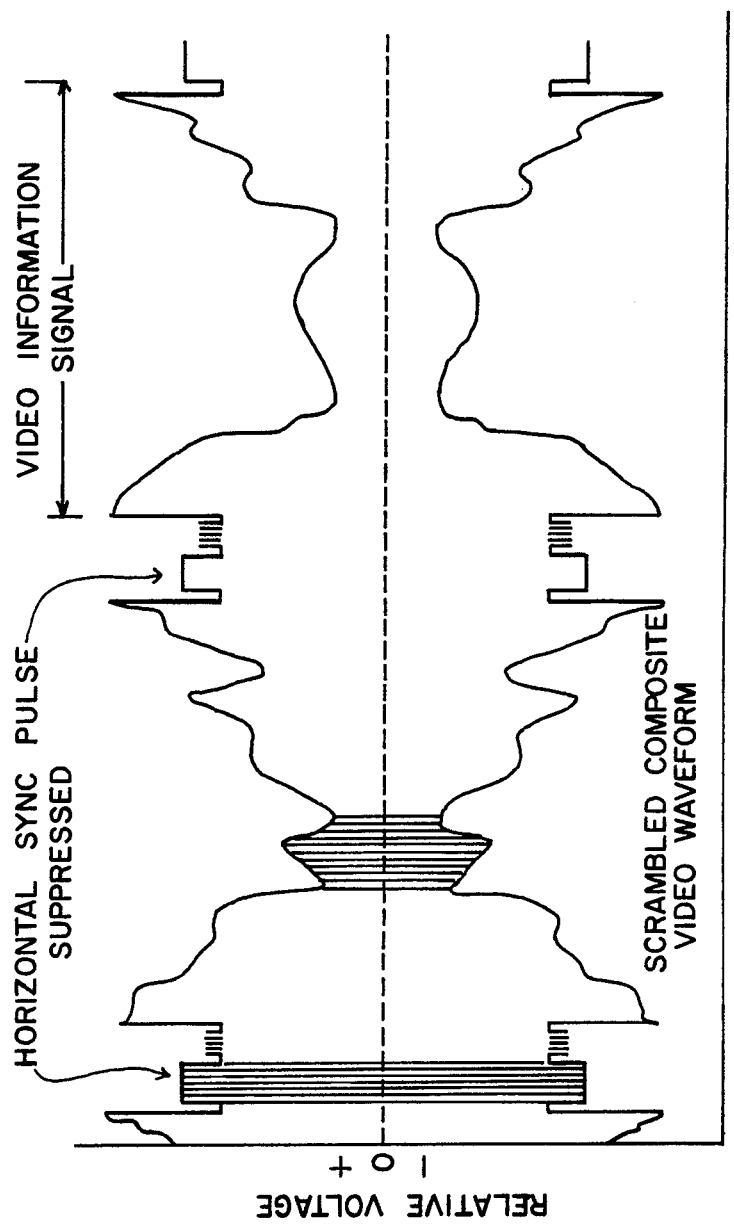
FIG. 4 illustrates a composite video signal which has been scrambled by horizontal synchronization pulse suppression.

Briefly, the present invention converts the unscrambled composite video waveform of FIG. 1 to the sync suppressed, scrambled composite video waveform of FIG. 4 during scrambling and essentially restores the unscrambled composite video waveform after descrambling. These effects are achieved by the scrambler 200 and descrambler 202 shown in FIG. 5.

Figure 5:
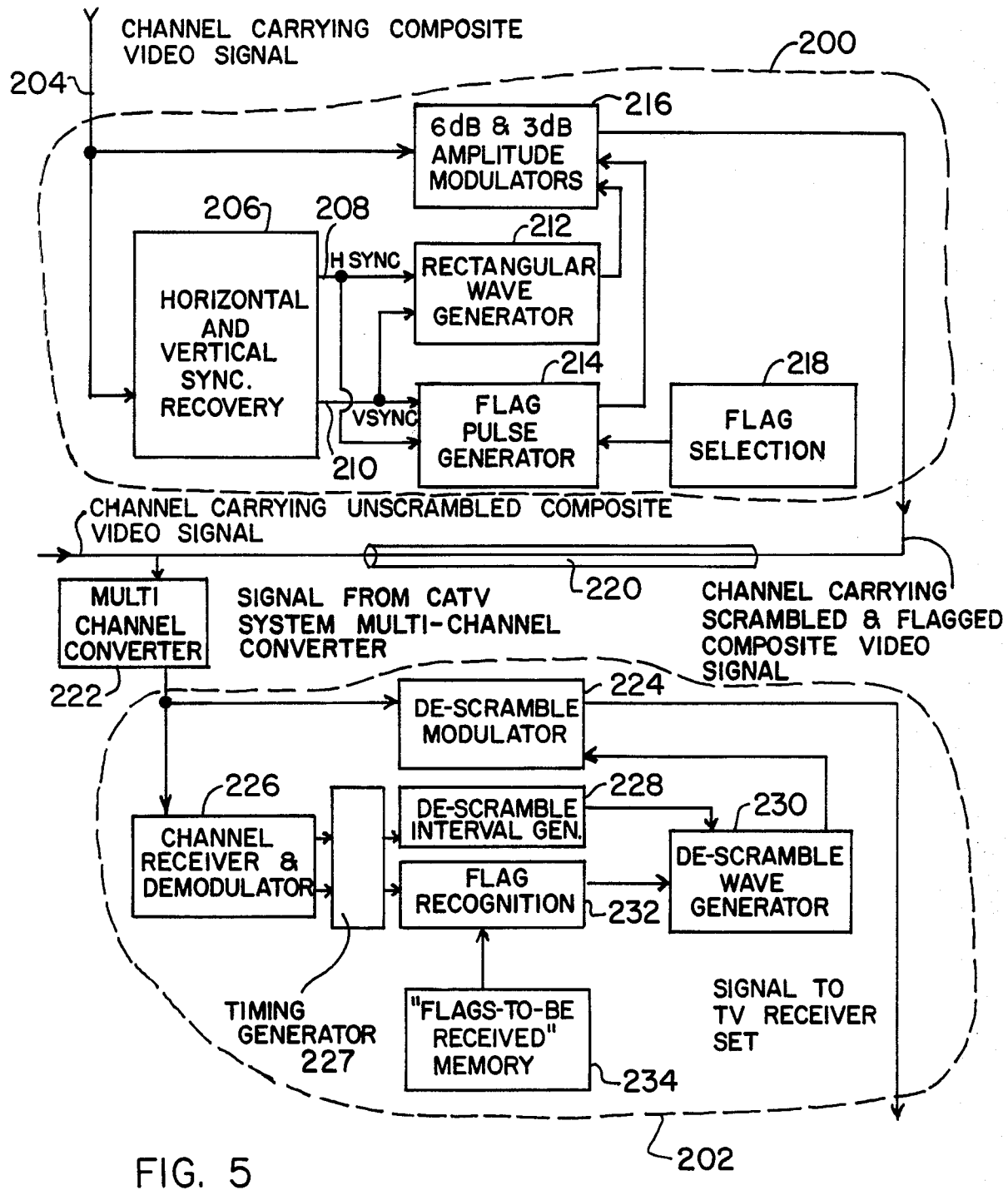
FIG. 5 is a general block diagram of the scrambler and descrambler of the present invention.

According to the block diagram of FIG. 5, a conventional composite video signal on a line 204 enters the scrambler 200 as input from a conventional television broadcast transmitter (not shown). Accordingly, the composite video signal on line 204 is like that shown in FIG. 1, including a video information signal, short horizontal sync pulses each having a corresponding back porch, and (not shown in FIG. 1) long serrated pulses and very short equalizing pulses occurring during periodic vertical blanking intervals. At least one horizontal sync pulse (also not shown in FIG. 1) is included in each vertical blanking interval. The composite video signal shown in FIG. 1, it will be noted, is an RF waveform, comprising an RF carrier which is amplitude modulated. The composite video signal may, alternatively, comprise an IF signal in which only the modulations and no RF carrier signal is provided. Whether in RF or IF form, the composite video signal has the characteristic that the video information signal component of the composite video signal has a considerably lower maximum amplitude than the amplitude of the horizontal sync pulses, the serrated pulses, and the equalizing pulses. Examining FIG. 1, for example, the maximum amplitude of the video information signal is approximately 80% of the magnitude of the horizontal sync pulses.

Referring again to FIG. 5, the composite video signal is shown entering a horizontal and vertical sync recovery element 206, which uses the amplitude and pulsewidth differences in the various signal components of the composite video signal to provide horizontal sync pulses (HSYNC) on line 208 and vertical sync pulses (VSYNC) on line 210. Both the HSYNC pulses and the VSYNC pulses enter a rectangular wave generator 212 and a flag pulse generator 214. Based on the HSYNC and VSYNC pulse inputs (and timing pulses derived therefrom), the rectangular wave generator produces rectangular pulses, each of which extends over an interval referred to as a scramble window. Each of these rectangular scramble window pulses is timed to bracket (i.e. to extend before, during, and after) a corresponding horizontal sync pulse which occurs after the first horizontal sync pulse preceded by a two half-line space. The scramble window pulses are provided to an amplitude modulator 216 which receives the composite video signal as an input. The amplitude modulator 216 is designed to attenuate the incoming composite video signal by approximately 6dB when a scramble window pulse is applied. That is, as illustrated in FIG. 4, the composite video signal is attenuated such that the horizontal sync pulses, occurring after the first horizontal sync pulse preceded by a two half-line space, are significantly reduced in amplitude. Accordingly, the attenuated horizontal sync pulses become indistinguishable (by amplitude) from the video information signal. Attenuating the horizontal sync pulses by 6dB, it should be noted, forces the amplitude of the attenuated horizontal sync pulses to a level well below the maximum amplitude of the video information signal. This suppression of selected horizontal sync pulses prevents a conventional television receiver set (not shown) from achieving synchronization and from displaying any meaningful image.

In addition to suppressing the horizontal sync pulses occurring after the first horizontal sync pulse preceded by a two half-line space, the scrambler 200 in FIG. 5 also inserts identification flags to the composite video signals. Briefly, the flag pulse generator 214 receives the HSYNC and VSYNC pulses as inputs and defines time slots in the composite video signal into which flag pulses may be inserted. Time slot timing is based on the timing of the HSYNC and VSYNC pulses. A flag selection element 218 informs the flag pulse generator 214 into which of the defined time slots in the composite video signal a flag pulse should be inserted. The flag pulses, as discussed below, are inserted, preferably, in time slots between certain equalizing pulses. The flag pulse generator 214 provides an output of flag pulses in corresponding selected time slots, the flag pulses being applied to the composite video signal by means of the amplitude modulator 216. That is, in response to a flag pulse input from the flag pulse generator 214, the amplitude modulator 216 effects a relative increase in amplitude by approximately 3dB during the corresponding time slot. The relative increase appears as a short positive pulse inserted into the composite video signal.

The output of the amplitude modulator 216 thus corresponds to the composite video signal after the horizontal sync pulses, occurring after the first horizontal sync pulse preceded by a two half-line space, have been attenuated and after flag pulses have been inserted into appropriate time slots. The output of the amplitude modulator 216 thus represents a scrambled composite video signal bearing inserted category identification flags.

The scrambled and flagged composite video signal is conveyed through a medium 220 enroute to the descrambler 202. In FIG. 5, the medium 220 is shown as a cable in a cable television system. The medium 220, it should, of course, be noted, may alternatively comprise a waveguide (if the transmissions are in microwave form), air (if the transmissions are in microwave form), or such other recognized communication medium, provided appropriate known signal conversion apparatus is included. In a multichannel system, a multichannel converter 222 may be located between the medium 220 and the descrambler 202. The multichannel converter 222 permits the selection of one of a plurality of channels for viewing. The channels may carry unscrambled composite video signals, which require no descrambling, or may carry scrambled and flagged composite video signals. In either case, the signal on the selected channel enters the descrambler 202. If the signal is an unscrambled composite video signal, the descrambler 202 (as discussed below) will let such signal pass unaltered. Otherwise, the descrambler 202 will effect signal descrambling if appropriate.

Specifically, a scrambled and flagged composite video signal which enters the descrambler 202 is split, the signal entering a descramble modulator 224 and a channel receiver and demodulator 226. The channel receiver and demodulator 226 performs various conventional functions (such as amplifying, bandpass filtering, and providing automatic gain control of the vertical sync peak) on the input from the multichannel converter 222. The output of the channel receiver and demodulator 226 enters a timing generator 227 and a descramble interval generator 228 which, based on the unattenuated pulses, derives the time intervals in the scrambled and flagged composite video signal during which horizontal sync pulses are attenuated. The derived time intervals are provided as one input to a descramble wave generator 230. Also connected between the channel receiver and modulator 226 and the descramble wave generator 230 is a flag recognition element 232. The flag recognition element 232, in effect, determines if the flags inserted into a composite video signal in the scrambler 200 identify signals which the descrambler 202 is programmed to descramble. A programmable flags-to-be-received memory 234 provides input to the flag recognition element 232, indicating which flagged scrambled composite video signals should be descrambled. When a scrambled composite video signal includes a flag which matches a corresponding programmed condition in the memory 234, a signal is provided which directs the descramble wave generator 230 to provide a pulse output corresponding to each time interval derived by the descramble interval generator 228. The pulse output from the descramble modulator amplifies scrambled composite video signals by approximately 6dB during each pulse output form the descramble wave generator 230. The attenuated horizontal sync pulses are thus amplified. The output from the descramble modulator 224 is provided to a conventional television receiver set (not shown). The receiver set, it should be noted, has a common phase-locked flyback circuit for vertical retrace. The receiver set ignores the inserted flag pulses during signal processing.

2. Detailed Description of the Scrambler

Referring to FIG. 6, circuitry comprising the horizontal and vertical sync recovery element 206 (of FIG. 5) for a standard U.S. television communication system is shown. The composite video signal passes through an amplifier 300 which provides sync tip automatic gain control (AGC). The AGC assures that the sync tip remains in the linear portion of the amplifier response even after the composite video signal undergoes clipping. The output of the amplifier 300 enters a conventional sync separation circuit 302 which provides HSYNC* and VSYNC* outputs, which represent conventional horizontal and vertical sync pulse output which are of limited stability. The HSYNC* and VSYNC* outputs enter sync regeneration circuitry 304 which, in the preferred embodiment shown in FIG. 6, control the operation of a MM5321 integrated circuit (IC) 306 which will generate a more stable, complete TV sync waveform, indicated as HSYNC and VSYNC. The IC 306 requires a 2.04545 MHz clock of good stability. The circuit for providing this clock includes a crystal oscillator 308 at 14.3339 MHz used in conjunction with a 74LS04 active component 309. An output pulse string from component 309 is passed through a 74LS00 gate 310 to a 74LS163 connected to form a $\div 7$ circuit 312. It should be noted that the crystal oscillator frequency is $(7 \times 2.04545 \times 10^6) + 15743 = 14.3339$ MHz. That is, the frequency is seven times the required clock to which is added one times the line frequency. By closing the gate 310 for one oscillator pulse at each line time exactly, the correct clock frequency is obtained. In order to control the gate 310 on the crystal oscillator output line, the phase of the regenerated horizontal sync HSYNC developed by the MM5321 306 is compared to the phase of the horizontal sync pulse HSYNC* from the sync separation element 302. Both of these signals are first delayed about $\frac{2}{3}$ line time—one with fixed delay 314 and the other with a variable delay 316. The delay pulses are connected to a phase discriminating NAND gate 318 which assumes a logic "zero" output if both pulses are present at the same time. This low output will close the gate 310 on the crystal oscillator output line; thus retarding the phase of all the signals derived from the MM5321 circuit 306. In operation, a stable phase condition is achieved where one cycle of the crystal oscillator 308 is dropped on most horizontal line times. When a phase disturbance occurs in the composite video signal, the gate 310 can shift to drop two or zero clock cycles as required to realign phase. The maximum phase jitter is one cycle of the crystal oscillator 308, e.g. 69 nanoseconds in this specific embodiment. If the signal suddenly becomes 180° out of phase, the clock circuit will achieve sync again in 455 lines or about 0.03 seconds. There is no bounce or overshoot. High level noise pulses in the video are very limited in their ability to disturb the phase or frequency of the clock by any great amount. The MM5321 IC 306 also provides a color burst gate to a back porch clamp 320 which is included to diminish low frequency noise. The regenerated sync pulses HSYNC and VSYNC enter a sync adder 322 as a composite sync signal which is applied to the video information signal output of the amplifier 300, thereby providing an enhanced composite video signal with more stable synchronization. It should, of course, be noted that the conventional HSYNC* and VSYNC* outputs may be used directly as sync outputs without sync regeneration. That is, HSYNC* and VSYNC* may be substituted for HSYNC and VSYNC. However, the regeneration process enhances timing precision.

Figures 1, 7A:
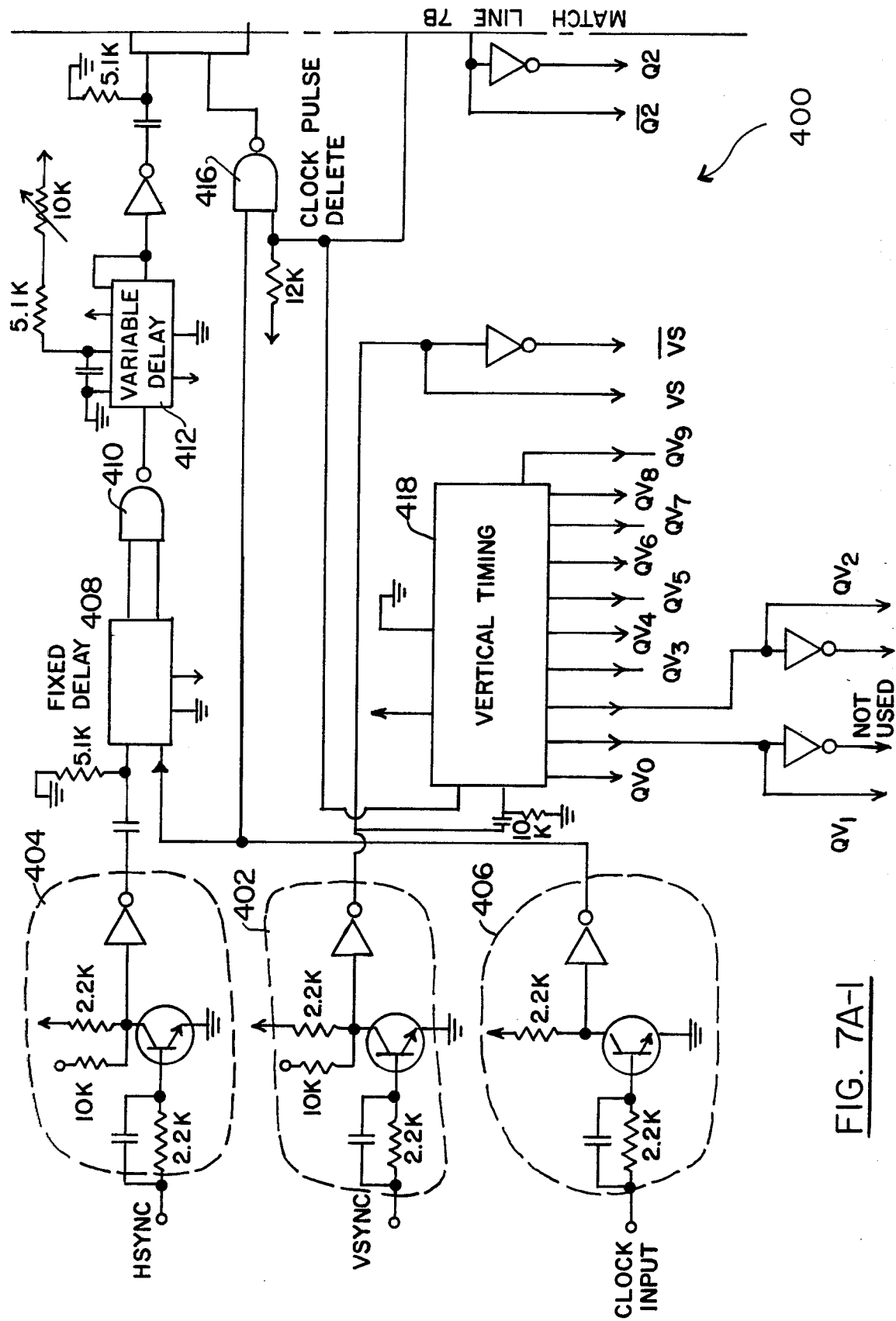
FIGS. 7A and 7B is a detailed diagram of the rectangular wave generator (212) of the scrambler (200) shown in FIG. 5.
Figures 2, 7A:
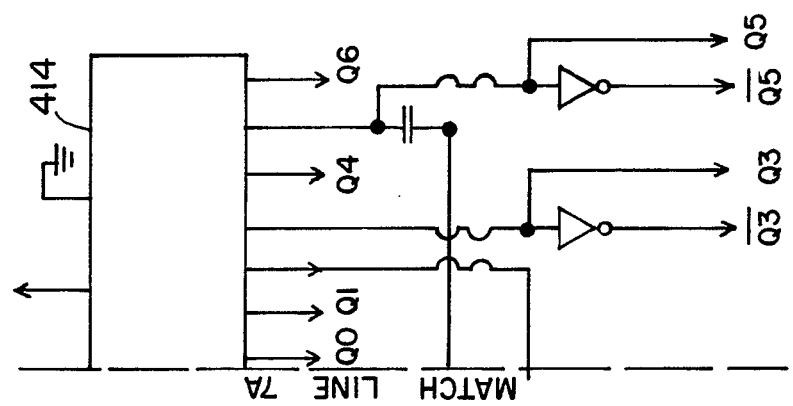
Figure 7B:
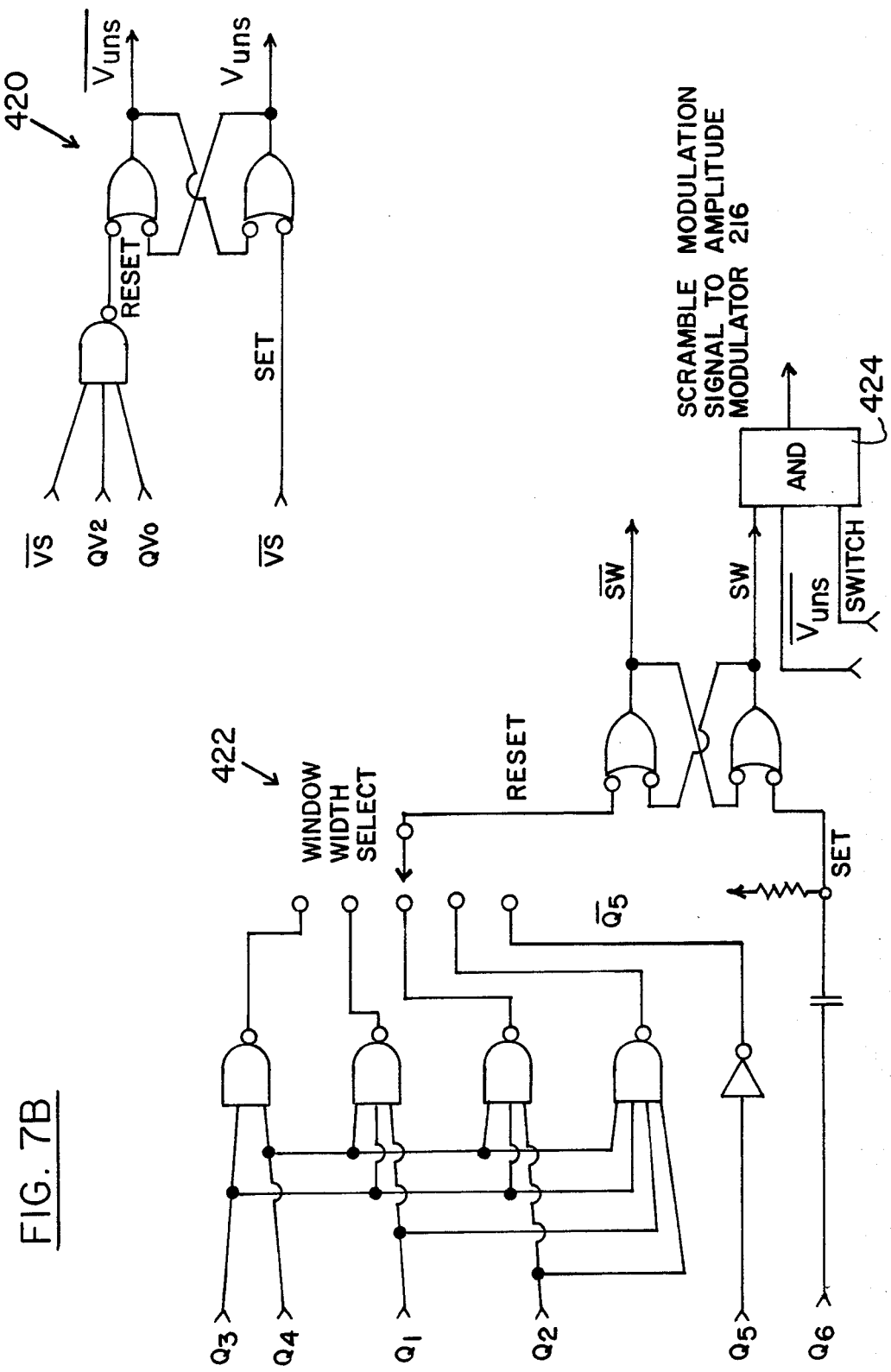

FIGS. 7A and 7B shows circuitry included in the rectangular wave generator 212 (of FIG. 5). FIG. 7A, in particular, shows circuitry 400 for generating various timing outputs used in both scrambling and inserting flags into a composite video signal. The regenerated VSYNC pulses are amplified through circuitry 402 and are split into a VS signal (during VSYNC) and a complementary $\overline{VS}$ signal. The regenerated HSYNC pulses are amplified by circuitry 404 and enter a fixed delay 408 (shown as a C4024) together with a clock input which is amplified by circuitry 406. The outputs of the fixed delay 408 provide inputs to a gate 410, the output from which passes through a variable delay 412. The horizontal sync (HSYNC) pulses enter a $\div 130$ divider 414 which provides six outputs $Q_0$ through $Q_6$. The divider 414 provides 130 clock pulses per horizontal scan line to coincide with the operation of the MM5321 IC 306 (of FIG. 6). The generating of these 130 clock pulses is achieved by use of one chip and one extra gate. In particular, a short pulse produced by the resetting of output $Q_5$ from the counter 414 is used to gate out one clock pulse to gate 416. This makes the divider 414 divide by 65 and then repeat—giving the desired divide by 130. A particular advantage of this arrangement relates to the use of the outputs of the divider 414 to subdivide the line time to produce time slots for flags. The timing signals divide a half-line into four segments of relative size 17/16/16/16, where the larger segment provides desirable extra guard time around the equalizing pulses found in the flag lines (discussed below). Vertical timing is generated by clocking a counter 418 (shown as a 4040) having VSYNC as a reset. Timing outputs $QV_0$ through $QV_9$ are provided.

Referring now to FIG. 7B, an unsuppressed interval generator 420 and a scramble window generator 422 are shown, each of which provides outputs based on the timing signals generated by circuitry 400. The unsuppressed interval generator 420, in the specific embodiment, provides a $V_{UNS}$ output for the first twenty-one half-lines of each field and $\overline{V_{UNS}}$ otherwise. The scramble window generator 422 provides a continuous string of periodic pulses on the SW line having the same frequency and phase as the HSYNC pulses. The width of the SW pulses is selectable and, preferably, brackets a corresponding HSYNC pulse. Because HSYNC pulses in adjacent fields of a frame are 180° out of phase, the SW pulses which, in effect, are derived from the HSYNC pulses, also undergo a shift in phase from one field to another. In order that only HSYNC pulses occurring outside the vertical blanking interval be attenuated, the SW output is gated at an ANDing gate 424 with the $\overline{V_{UNS}}$ pulse output. A switch (not shown) may also be ANDed in gate 424 for turning the scrambler 200 "on" and "off". An inverse of the SW output is provided as $\overline{SW}$. The output of the gate 424 is applied to the amplitude modulator 216 (of FIG. 5.)

Figure 8:
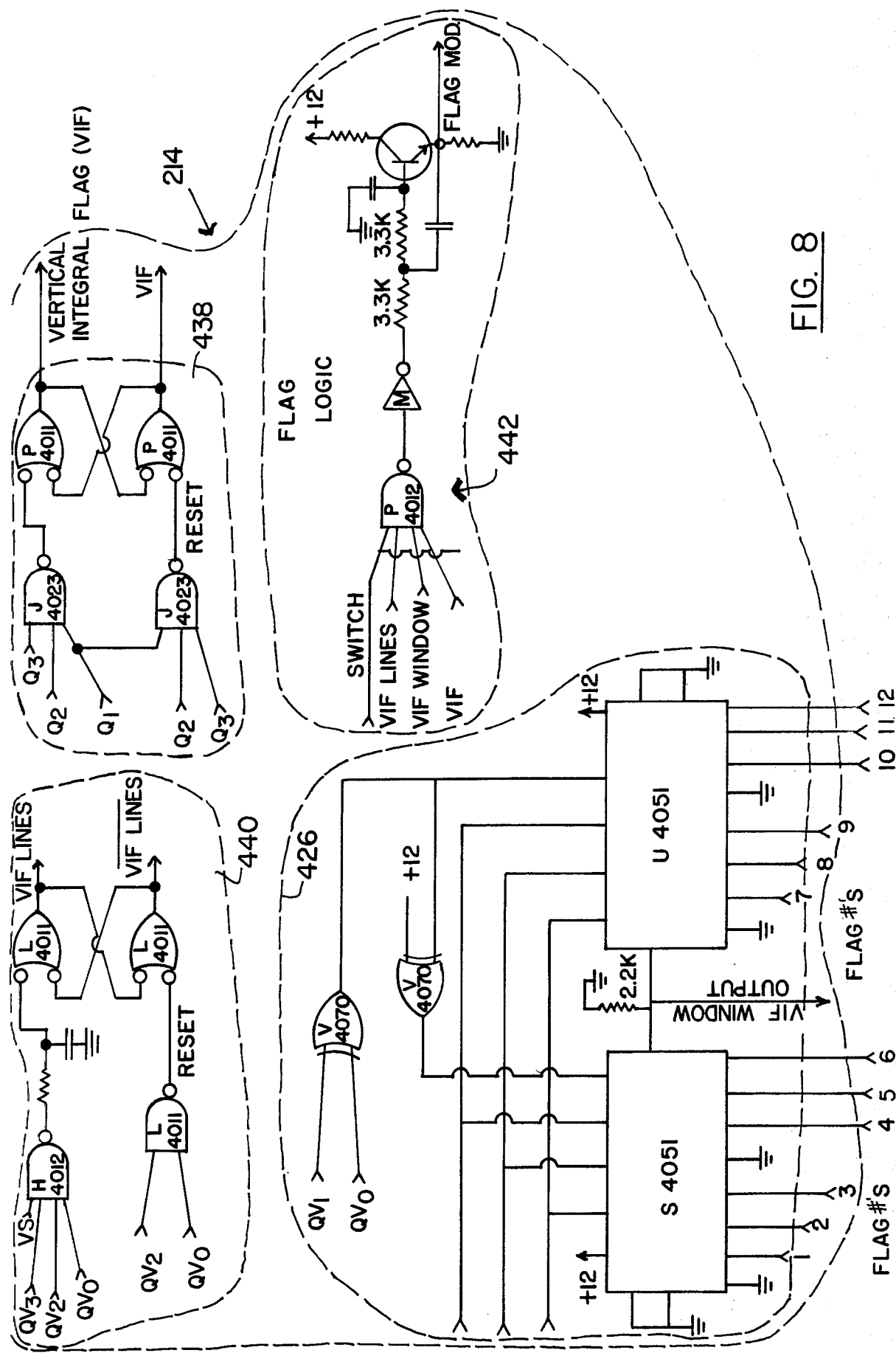
FIG. 8 is a detailed diagram of the flag pulse generator (214) of the scrambler (200) shown in FIG. 5.
Figure 9A:
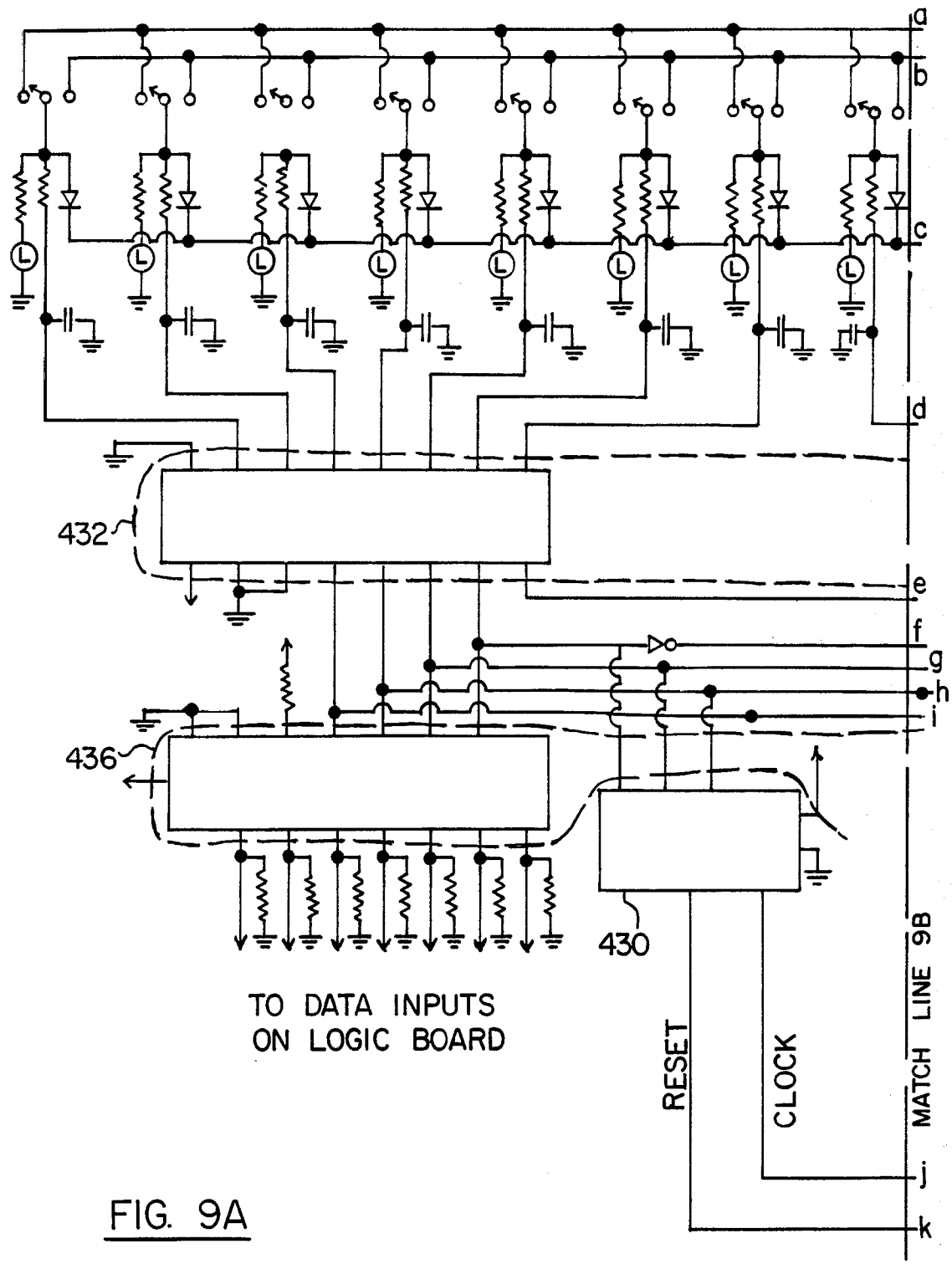
FIGS. 9A and 9B comprise a detailed diagram of the flag selection element (218) of the scrambler (200) shown in FIG. 5.
Figure 9B:
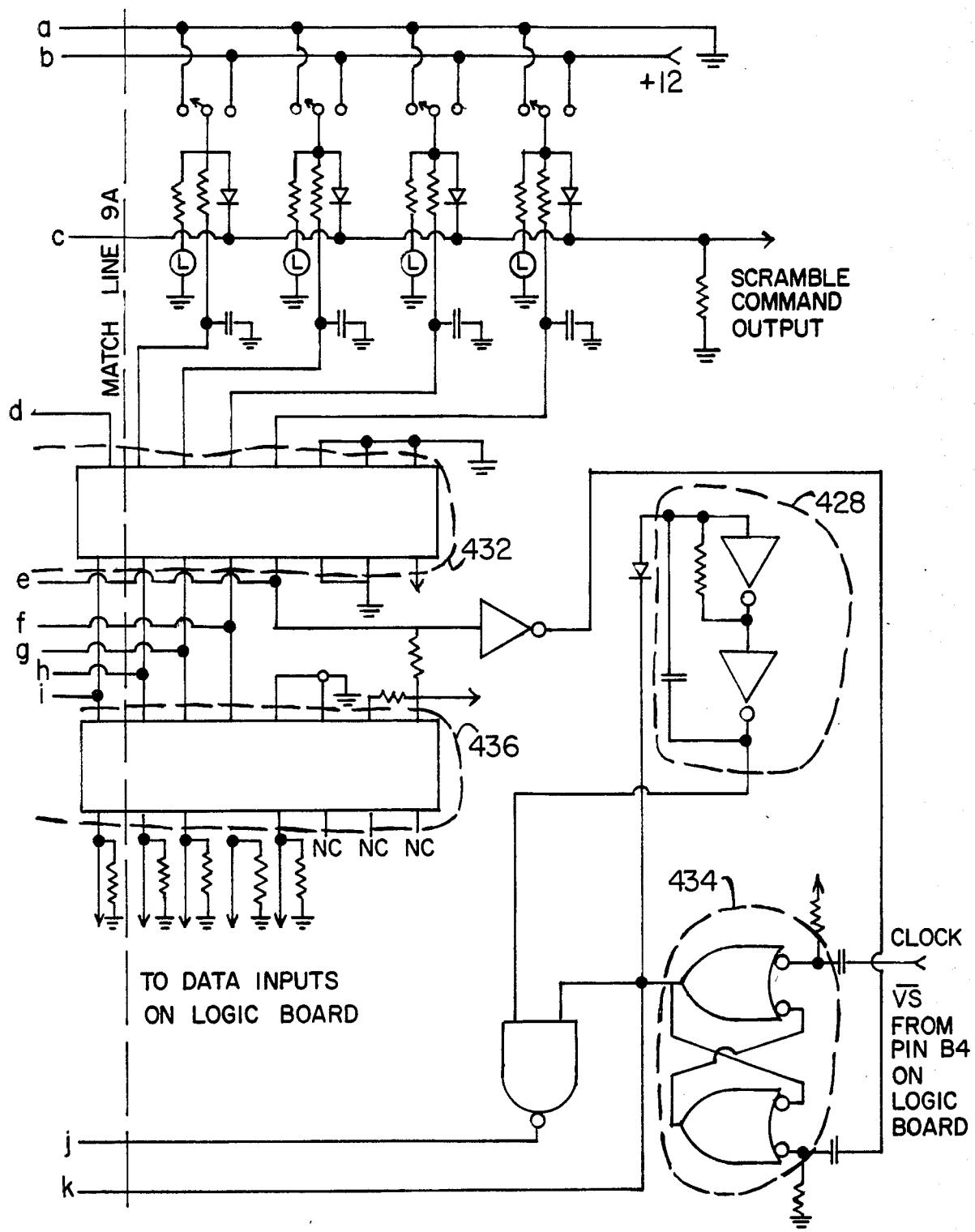

Referring to FIG. 8, circuitry for the flag pulse generator 214 is shown. Flags to be inserted into defined time slots are, in this specific embodiment, referred to as vertical interval flags (VIF) because the time slots occur within the vertical blanking interval. The VIF which is to be inserted is controlled by a Flag Number input to a VIF window generator 426 (identified in this embodiment as two conventional 4051 devices). Only one flag is inserted at any one time, but the flag can be changed from field to field (every 1/60 second). This is illustrated in FIG. 9 (formed of FIGS. 9A and 9B).

FIG. 9 shows the flag selection element 218 which develops the flag selection signal. An array of 12 switches, each with an indicator light (L) is provided. If only one switch is "on" the corresponding output line is raised to logic "one". If more than one switch is "on", the corresponding output lines are sequentially raised to logic "one" for one field time (1/60 second) and then returned to "zero". If more than four switches are "on" only the four of lowest number are used—those of higher number being ignored. To achieve this, an oscillator 428 operating at about 140 kHz drives a counter 430 which commutates a data selector 432 through the various switch outputs. This action is started when flip-flop 434 is set by a clock pulse from the timing circuitry 400. When the data selector 432 finds an "on" switch, its output resets the flip-flop 434 and stops the commutating action. The data distributor 436 is dirven by the same commutating signals, and it stops in position to supply logic "one" to the corresponding output terminal. Upon arrival of another clock pulse the action is started again and continues to find a second "on" switch. A four-event counter 438 counts off/on cycles of the flip-flop 434 and when four "on" switches have been found, the counter 430 is reset to the zero state to start over without regard to higher numbered switches which may be "on".

Referring again to FIG. 8, three elements which relate to flag insertion are shown. A vertical interval flag (VIF) generator 439 provides a VIF signal which indicates the time interval which contains all of the time slots into which a flag may be inserted. A VIF line generator 440 produces a VIF line signal which separately indicates each time slot into which a flag may be inserted. Third, the previously mentioned VIF window generator 426 indicates into which time slots a flag is programmed to be inserted. The VIF generator 438 and VIF line generator 440 also provide inverse outputs $\overline{VIF}$ and $\overline{VIF\ line}$, respectively. When a VIF signal, a VIF line signal, and a VIF window signal occur simultaneously (indicated as the scramble command output in FIG. 9), flag logic 442 provides a flag modulation signal which is directed to the amplitude modulators 216 of FIG. 5. The flag modulation signal provides an indication to the amplitude modulators 216 when an appropriate flag is present and should be inserted.

Figure 10:
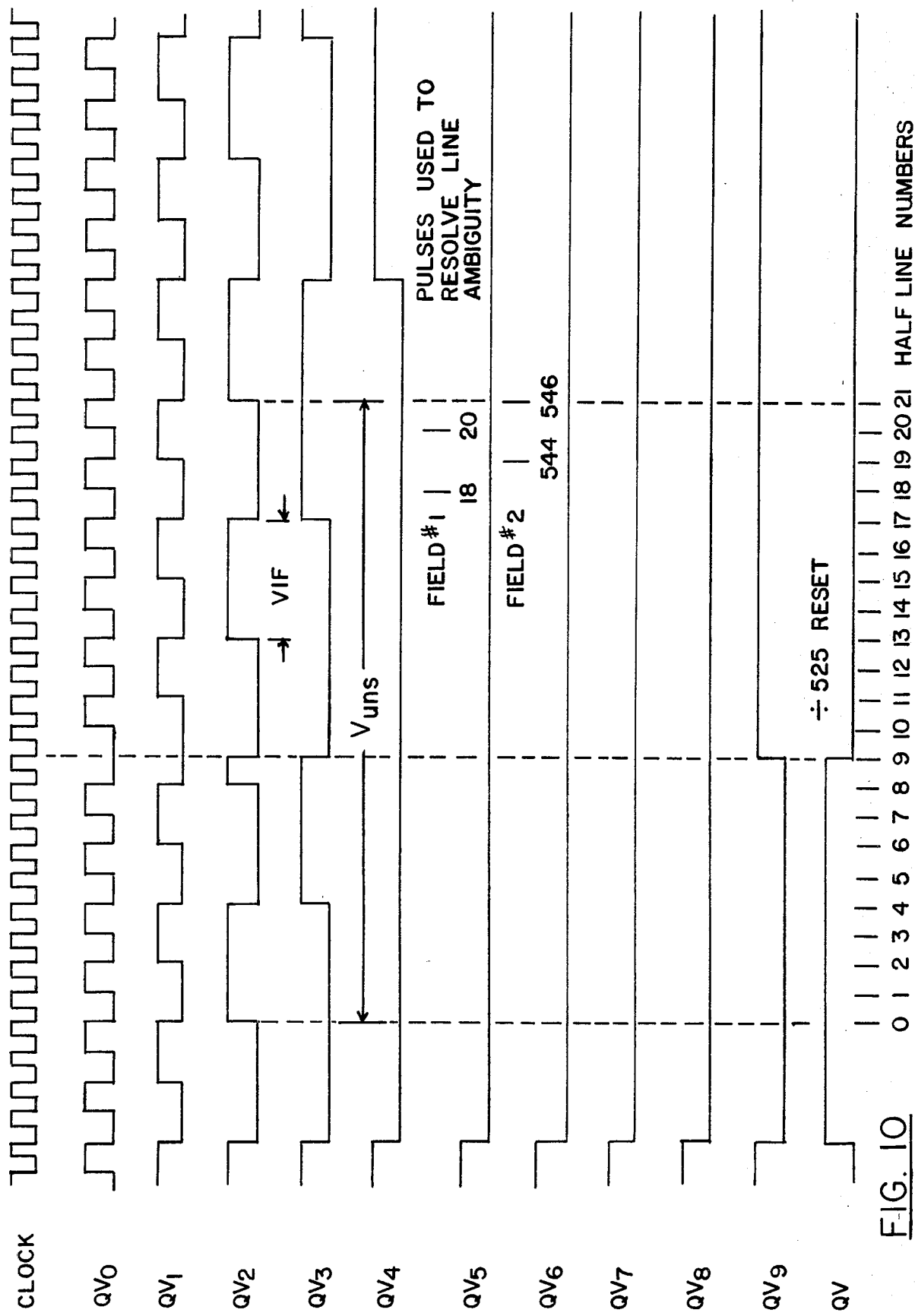
FIG. 10 is a timing diagram showing the pulse outputs $QV_0$ through $QV_9$ provided by the vertical timing element (418) shown in FIG. 7A. The appropriate timing for flag insertion relative to the $QV_0$ through $QV_9$ pulse outputs of FIG. 7A is also shown.
Figure 11:
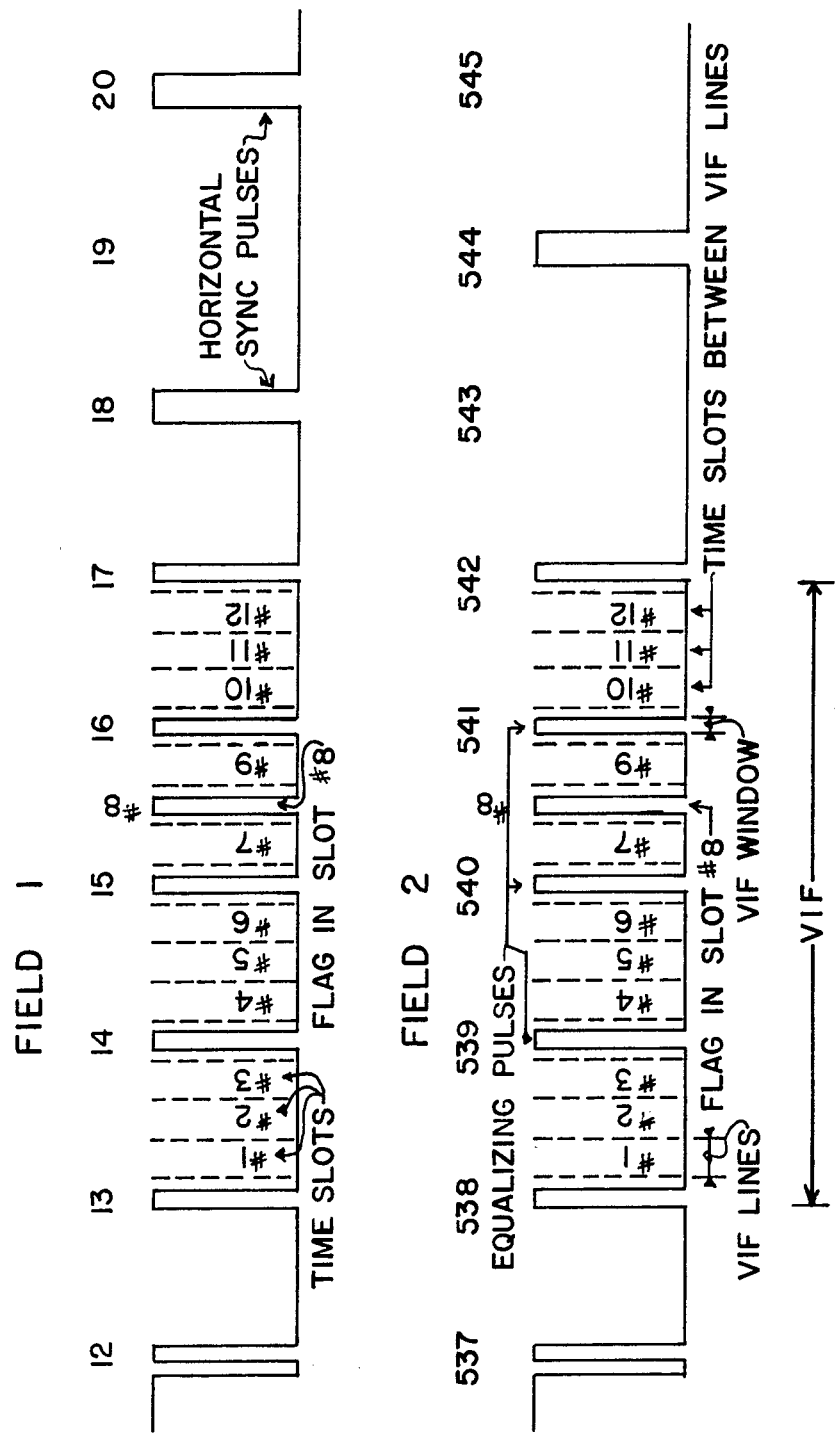
FIG. 11 is a timing diagram showing the insertion of a flag pulse in a time slot defined between two adjacent equalizing pulses.

Referring to FIG. 10, the timing of the signals relating to flag insertion is illustrated. The VIF signal (generated by element 438 of FIG. 8) defines the VIF interval between the 13th and 17th half-line of the first field and between the 538th and 542nd half-line of the second field in respective vertical blanking intervals in each field. In each VIF interval there are five adjacent equalizing pulses. These are shown in FIG. 11. Between each pair of adjacent equalizing pulses are three adjacent time slots, which are isolated in time from the equalizing pulses. FIG. 11 illustrates the insertion of a flag into a given time slot, namely time slot #8. It will be noted that the VIF window in which the flag is inserted is preferably shorter in duration than its corresponding time slot. (FIG. 11 also includes horizontal sync pulses 18, 20 and 544 which occur during the vertical blanking interval. The relative temporal positions of these pulses suggest the horizontal sync phase change from one field to another in a frame.)

Referring back to FIG. 10, the precise temporal relationship of the VIF interval relative to the vertical blanking interval of the first field of the frame is shown. The vertical blanking interval extends for the first twenty-one half-lines of the field as shown. At the time of the 9th half-line it will be noted that vertical timing is reset and resynchronized. In particular, the various vertical timing signals $QV_0$ through $QV_9$ (and $\overline{QV_0}$, previously discussed with regard to FIG. 7A are shown reset and resynchronized at the 9th half-line, being referenced to the 2.045 MHz clock input to amplifier 406 of FIG. 7A.

Figure 12:
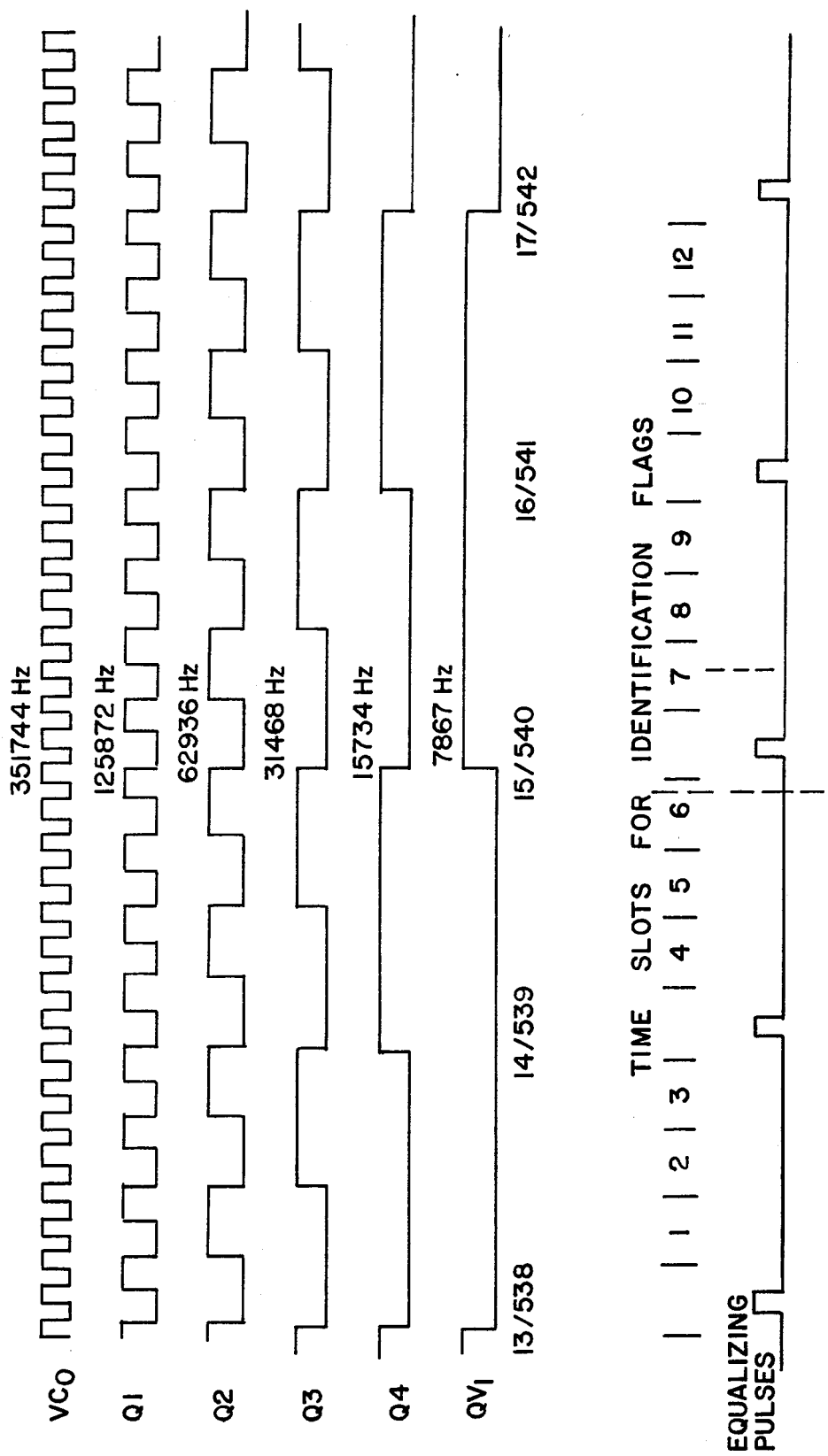
FIG. 12 is a timing diagram showing the pulse outputs $Q_0$ through $Q_4$, and $QV_1$ (shown in FIG. 14), together with equalizing pulses numbered for each of two fields. (e.g. pulse 13 in filed one/pulse 438 in field two) and time slots, defined according to the circuitry of FIG. 8 between the equalizing pulses, into which flag pulses are insertable.
Figure 14A:
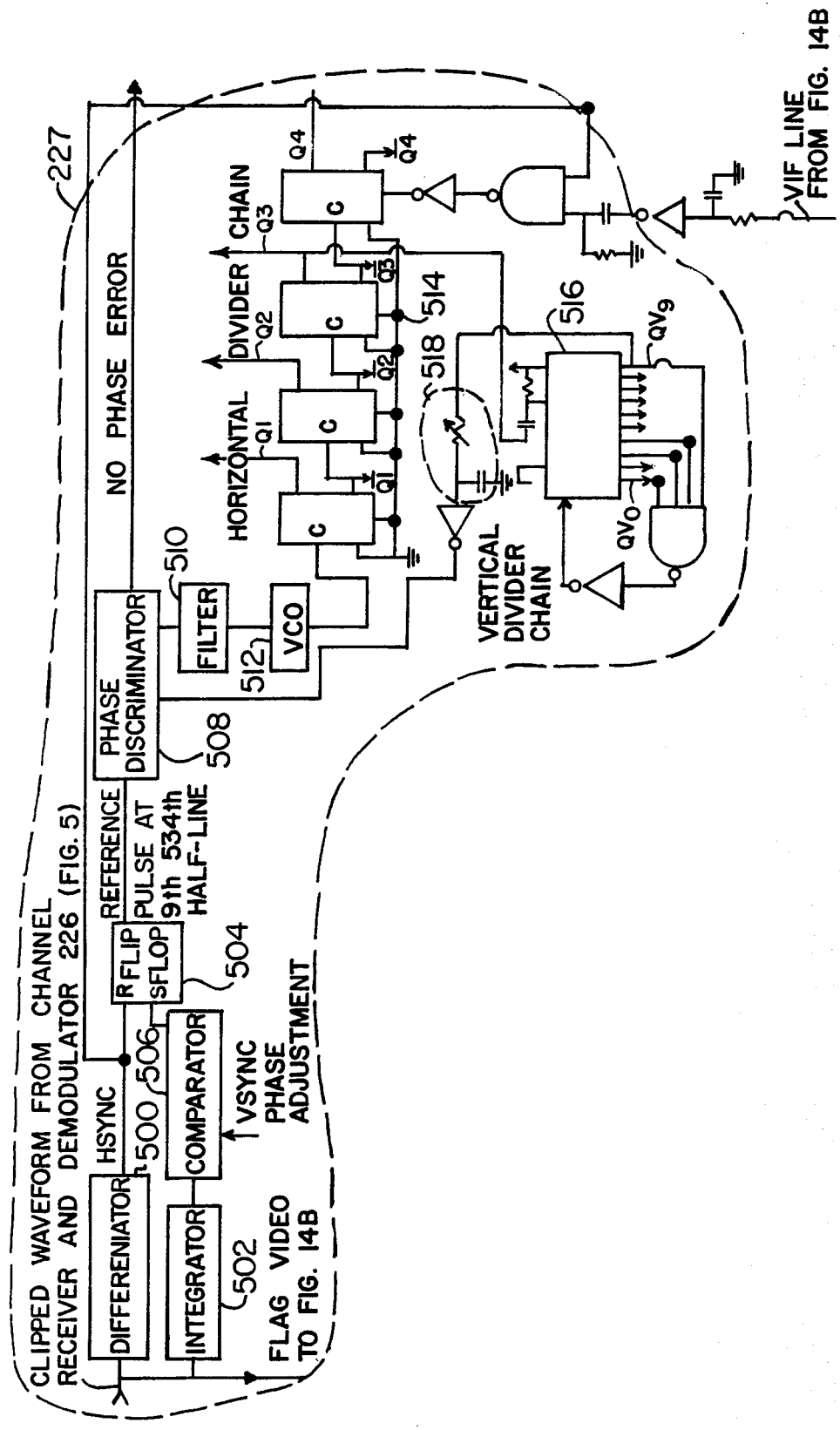
FIGS. 14A, B, and C comprise a detailed diagram of major elements of the descrambler (202) shown in FIG. 5.

The timing details of the horizontal timing circuitry of FIG. 14 are illustrated in FIG. 12. That is, the relative timing of $Q_1$ through $Q_4$; $QV_1$; the equalizing pulses occurring at half-lines 13 through 17 and 438 through 442 of FIG. 14 are shown. Relative to the scrambler 200, the location of time slots generated by the VIF line generator 440 of FIG. 8 is set forth.

Figure 13:
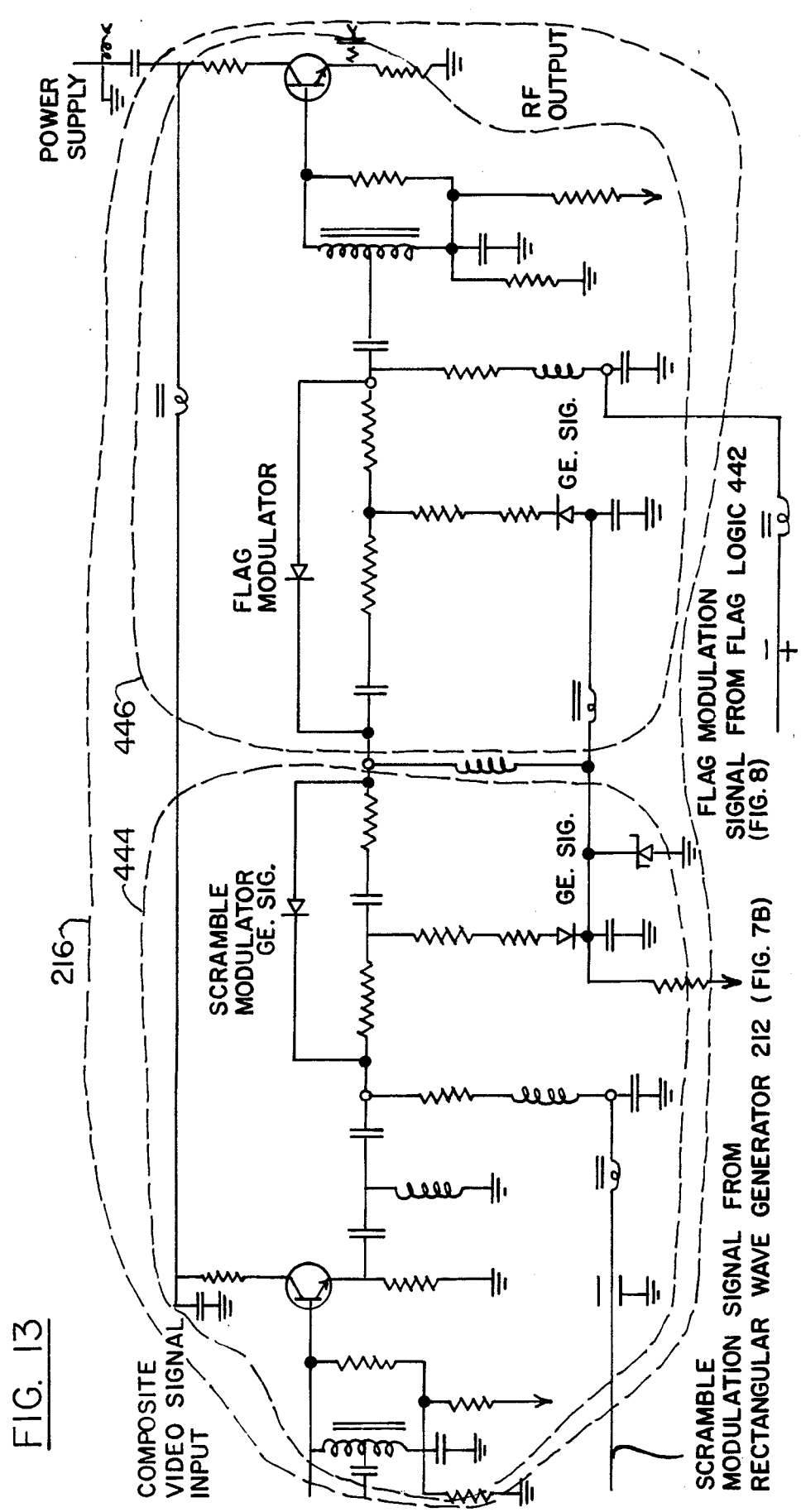
FIG. 13 is a detailed circuit diagram of the amplitude modulators (216) of the scrambler (200) shown in FIG. 5.

FIG. 13 illustrates the amplitude modulators 216 of FIG. 5. In accordance with the specific arrangement of FIG. 13, the composite video signal input is attenuated by 6dB when a scramble modulation signal is provided by the rectangular wave generator 212 (shown in detail in FIGS. 7A and 7B) to a scramble modulator 444. A flag modulator 446, on the other hand, normally applies 3dB of attenuation to its input, which attenuation is removed when the flag modulation signal is detected. Gain and impedance matching are also provided.

3. Detailed Description of the Descrambler

Referring to FIG. 14, the timing generator 227, the descramble interval generator 228 (shown in four parts as 228a, 228b, 228c and 228d), the flag recognition element 232, the flag-to-be-received memory 234, and the descramble wave generator 230 (all of FIG. 5) are illustrated in detail.

Figure 2:
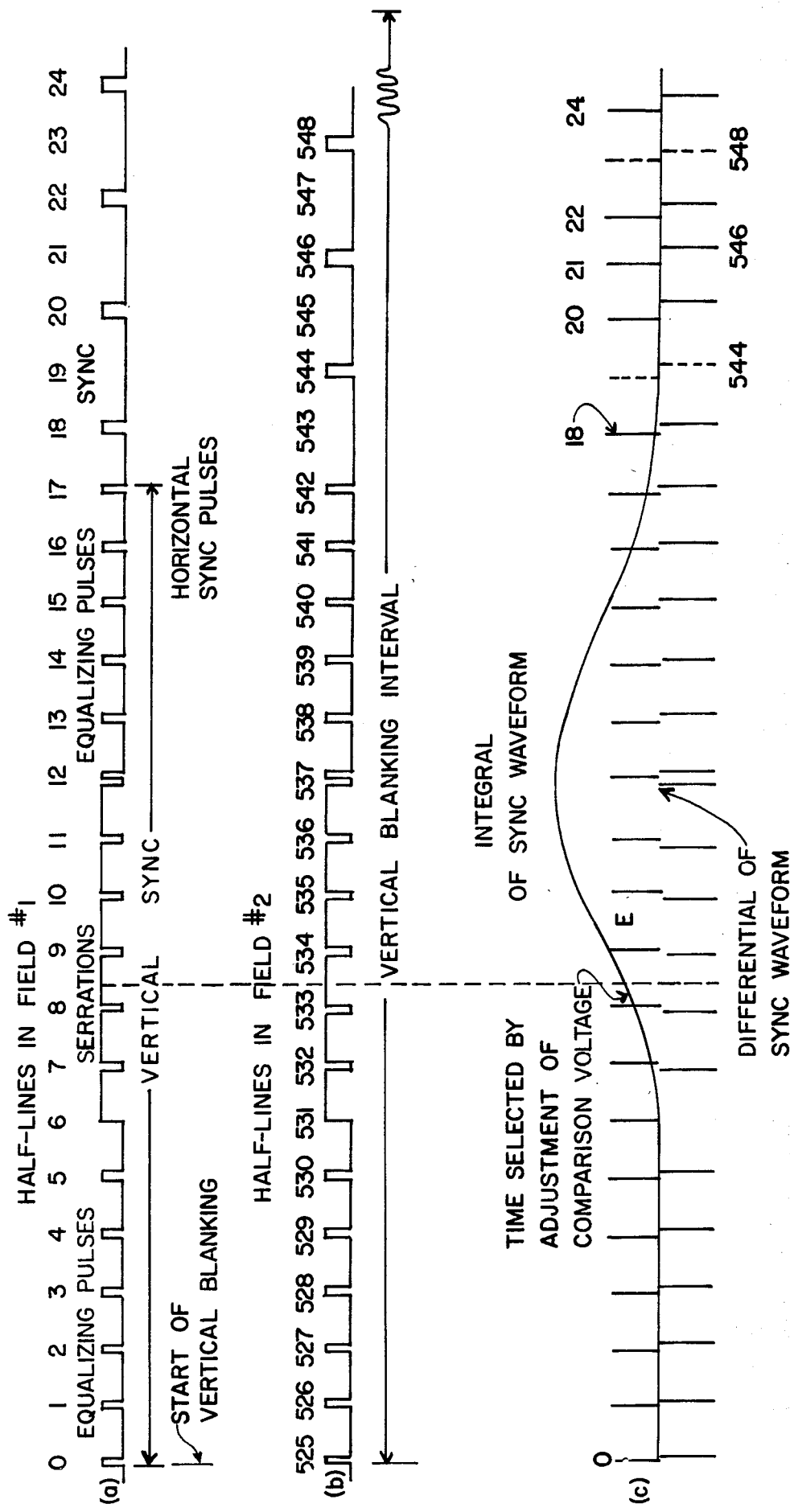
FIG. 2 illustrates a typical synchronization waveform clipped from a composite video signal along the two upper lines (a) and (b). Line (c) shows the waveforms resulting from differentiating and integrating the waveforms of lines (a) and (b).
Figure 3B:
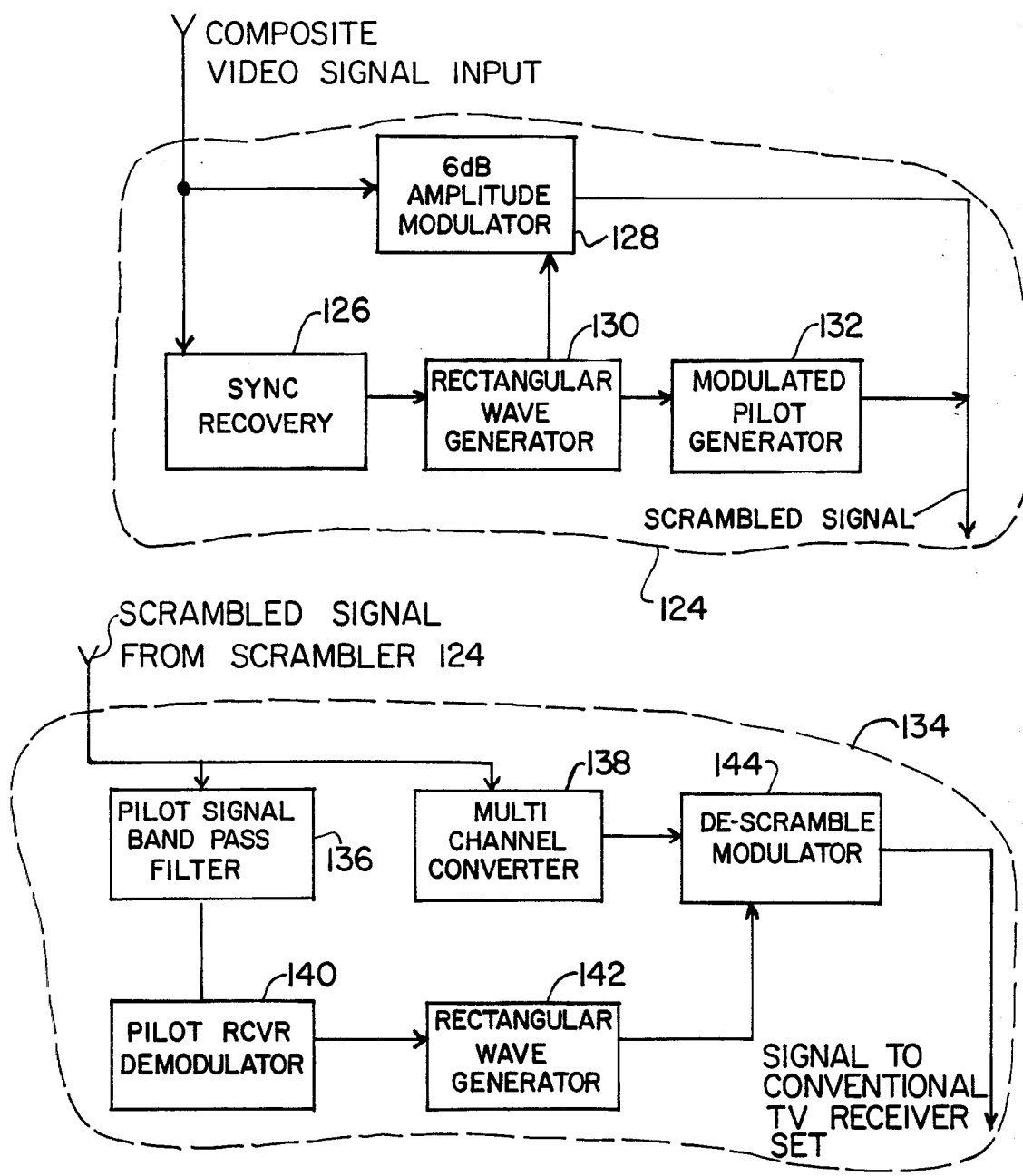

The timing generator 227 includes a differentiator 500 and an integrator 502 for simultaneously receiving the output of the channel receiver and demodulator 226, which output represents a clipped waveform. The clipped waveform should resemble the waveform of FIG. 2, except that when scrambled (a) there should be no pulses after the 20th half-line in the first field or after the 544th half-line in the second field, and (b) a flag pulse will be located between a pair of adjacent equalizing pulses selected from the pulses at the 13th, 14th, 15th, 16th and 17th half-lines in the first field (and the 538th through 542nd half-lines in the second field). The absence of pulses after the 20th and 544th pulses relates to the suppression by the scrambler 200 of all horizontal sync pulses after (i.e. outside) the vertical blanking intervals. As seen in FIG. 2, within the vertical blanking interval there is a string of six very short equalizing pulses followed by six long serrated pulses of standard width. Following the serrated pulses is a second string of six very short equalizing pulses between two of which is inserted a flag pulse. After the second string of equalizing pulses are one or two unattenuated horizontal sync pulses within the vertical blanking interval. The other sync pulses are suppressed.

The output of the differentiator 500 includes positive and negative pips produced at the rising and falling, respectively, of the various pulses which enter the differentiator 500. The positive pips provide reset inputs to a flip-flop 504. The output of the integrator 502 enters a comparator 506 which provides a set input to the flip-flop 504 when the voltage level of the integrator 502 exceeds a preset threshold level. The threshold level may be adjusted, thereby adjusting the time or phase of threshold excession. In the specific form of the invention, the threshold is exceeded somewhere between the eighth and ninth half-line time. Accordingly, the flip-flop 504 produces a reference pulse output when the pip corresponding to the 9th half-line time (of field one) resets the flip-flop 504. (See the resynchronization shown in FIG. 10 at the 9th half-line time.) In this regard, it should be noted that the flip-flop 504 is reset by pips of only one (e.g. positive) polarity. The reference pulses generated by the flip-flop 504 are more precise in time than the conventional vertical sync timing output of the comparator 506 and, therefore, provide a more accurate source from which to derive necessary descrambler timing. The reference pulses enter a conventional phase detector or discriminator 508, the output of which is filtered by element 510 and enters a voltage controlled oscillator (VCO) 512. The VCO 512 produces a signal at 251744 Hz, which signal is sequentially halved by a horizontal divider chain 514 which provides outputs $Q_1(\div 2)$, $Q_2(\div 4)$, $Q_3(\div 8)$ and $Q_4(\div 16)$ which correspond in timing to the $Q_1$ through $Q_4$ signals provided as shown in FIG. 12. The $Q_3(\div 8)$ output enters a vertical divider chain 516 which provides sequential outputs $QV_0$ through $QV_9$. The vertical divider chain 516 effects a $\div 525$ which exits along the $QV_9$ output line at the reference pulse, i.e. vertical sync, frequency of approximately 59.9 Hz, the standard U.S. vertical sweep frequency. The $QV_9$ output enroute to the phase discriminator 508 passes through a variable delay 518. The elements 508, 510, 512, 514, 516 and 518 comprise a phase-locked loop. Thus, the phase of all signals or pulses relative to the incoming scrambled, flagged composite video signal can be adjusted by changing the delay 518. The $Q_4$ output, it should be noted, is outside the loop and has an input which is gated with the output of the differentiator 500 (and the VIF line output discussed below) so that the $Q_4$ stage of the horizontal divider chain 514 is reset by the pulse occurring at the 18th or 544th half-line time depending on field. The resetting of $Q_4$ assures that descrambling is performed in proper phase notwithstanding the shift in phase of horizontal sync pulses from field to field.

Selected timing outputs from the timing generator 227 enter a vertical blanking generator 228a, a gate 228b, and noise immunity circuitry 228c of the descramble interval generator 228 (all shown in FIG. 14). In particular $QV_2$, $QV_3$ and $QV_9$ enter a gating network comprising the unsuppressed interval generator 228a which defines the unsuppressed interval ($V_{UNS}$) as the first twenty-one half-lines of each field. $\overline{V_{UNS}}$ is the complement of $V_{UNS}$. The gate 228b detects when pip outputs from the differentiator 500, which correspond to unsuppressed horizontal sync pulses, do not occur outside the unsuppressed interval (during $\overline{V_{UNS}}$). Such a condition suggests that the incoming composite video signal was initially scrambled. The gate 228b also implicitly detects when a horizontal sync pulse pip does occur outside the unsuppressed interval, which suggests there was no signal scrambling, which condition precludes descrambling. The output of gate 228b enters another gate 520 (of the noise immunity circuitry 228c) as an input. Also entering the gate 520 is a signal from the phase discriminator 508 which indicates when there is no phase locked timing loop. A third input to the gate 520 relates, in part, to the presence of a properly inserted flag and comes from a descramble command generator 522. The descramble command generator 522 includes a counter 523 which provides a plurality of descramble commands, or pulses, during successive unsuppressed intervals in response to a reset input thereto. If the counter 523 reaches a predetermined count before being again reset, descrambling is discontinued. The counter 523 permits a transmitter station (not shown) to insert a first distinct flag pulse in unsuppressed intervals 1, 5, and 11, for example, and a second distinct flag pulse in unsuppressed intervals 2 and 8 and permits a receiver set having a counter 523 which counts to eight to continue descrambling whether programmed to accept broadcasts associated with the first flag pulse or the second flag pulse or both. Similarly, a third distinct flag pulse (relating to still a third category of broadcast), if present in unsuppressed intervals 3 and 13, would discontinue descrambling after unsuppressed interval 10, the counter 523 exceeding eight before resetting.

The descramble command generator 522 provides an input to the gate 520 when (1) a flag on the clipped waveform is (2) in a VIF window (3) between two VIF lines, i.e. is in a prescribed time slot, (4) during a unsuppressed interval. These conditions are determined by the flag recognition element 232 and flags-to-be-received memory 234. Specifically, a VIF line generator 524 is connected to receive as inputs the $QV_2$ and $QV_9$ outputs of the divider 516. VIF line generator gating (shown in FIG. 14) functions to divide the interval between half-line times 13 and 17 into sixteen intervals, four of which contain equalizing pulses and the remaining twelve being grouped into four time slot triplets, each time slot triplet being interposed between two intervals which contain adjacent equalizing pulses. This timing arrangement matches that discussed with regard to FIG. 11 relative to the description of the scrambler. Also as in FIG. 11, a descrambler VIF window generator 526 provides window pulses corresponding to flags programmed into a PROM 530 which comprises the flags-to-be-received memory 234. The twelve outputs of the PROM 530 are read out in sequence by the single pole 12-throw switch 532, thereby providing a VIF window array. The switch 532 is stepped by the $Q_2$, $Q_3$, $Q_4$ and $QV_1$ signals.

Referring now to the descramble window generator 228d in FIG. 14, a descramble time interval window is generated which brackets each attenuated HSYNC pulse and which has a pulsewidth that is greater than the pulsewidth of the bracketed attenuated HSYNC pulse and is shorter in duration than the scramble window.

Figure 15:
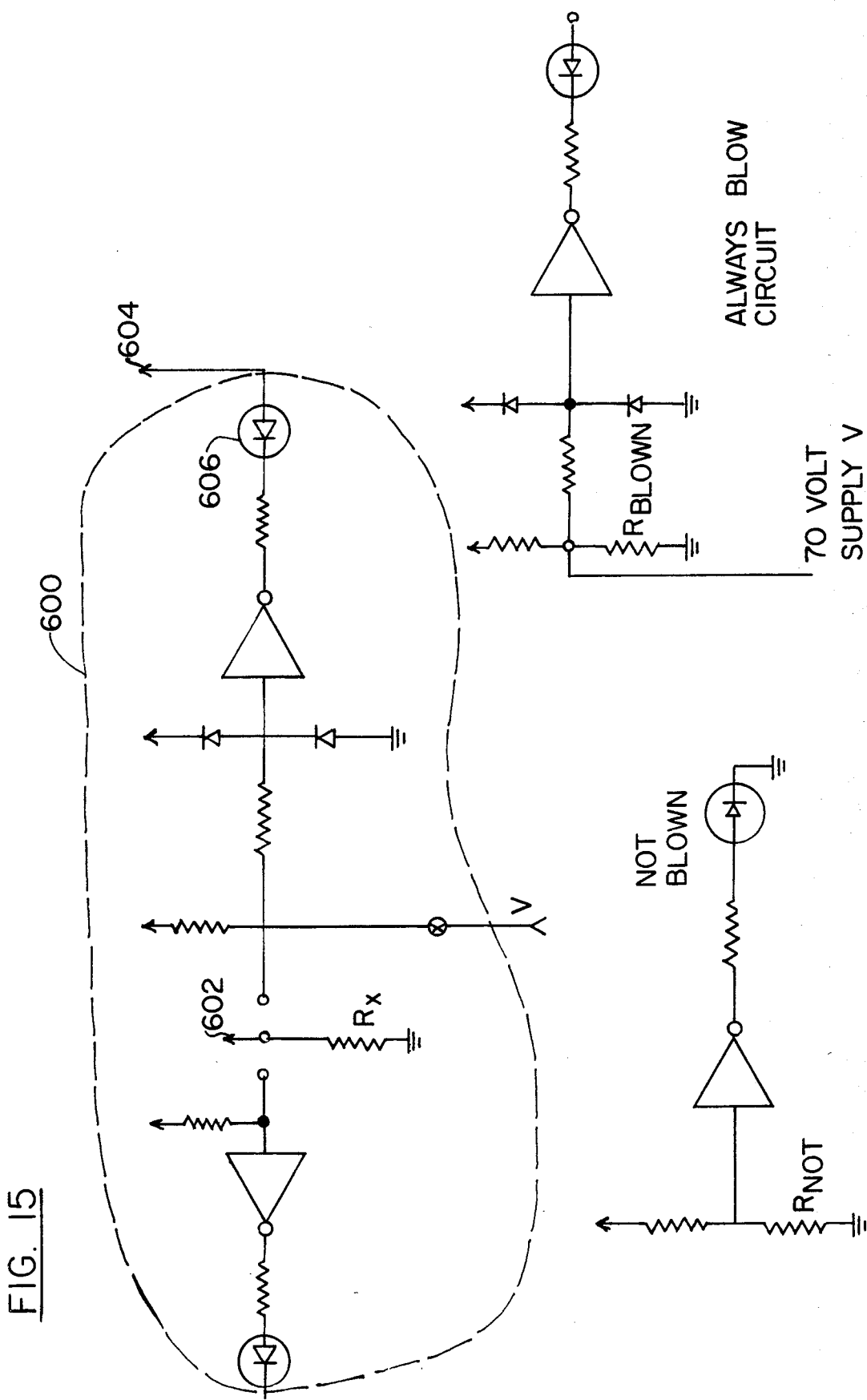
FIG. 15 is a detailed diagram showing the circuitry employed in programming the flags-to-be-received memory (234) of the descrambler (202) shown in FIG. 5.

As noted previously, the signals generated by the timing generator 227 may be readily employed to effectuate this end. For example, applying Q4 to the upper input line of the descramble window generator 228d and applying Q1 and Q2 to the two lower lines, a DSW wave is provided which can be directed to gate 528 together with a descramble command and a $\overline{V_{UNS}}$ input. One notable portion of the descrambler 202 (of FIG. 5) is the PROM 530 of FIG. 14. Unlike other memories, PROM 234 has memory elements which blow open, not closed, when programmed. FIG. 15 shows one such element $R_x$ thereof and the programming circuitry 600 related thereto. Toggling a switch 602 to position B and applying a high voltage V momentarily will blow the resistor $R_x$ open. A corresponding output on line 604 and light 606 indicate that $R_x$ is a programmed element. Specifically, an unblown $R_x$, with the switch 602 at position B, will cause a low input which inhibits LED 606 from lighting. If $R_x$ is blown, a high voltage enters the LED 606. Similarly, in switch position A, an unblown $R_x$ will cause the "not blown out" LED to light.

Further, by way of including a tamper-proof feature, three extra resistors are provided. Two of the resistors are located at a point which require that they be blown open; otherwise the descrambling will be inhibited. This prevents unauthorized individuals from programming unprogrammed PROMs for descrambling. The third resistor is installed blown open and at a location requiring the presence of the blown open resistor in order for descrambling to occur. If the PROM 530 is removed, the descrambler 202 (of FIG. 5) will not operate unless two jumpers are properly installed. This feature deters unauthorized reprogramming.

Figure 16:
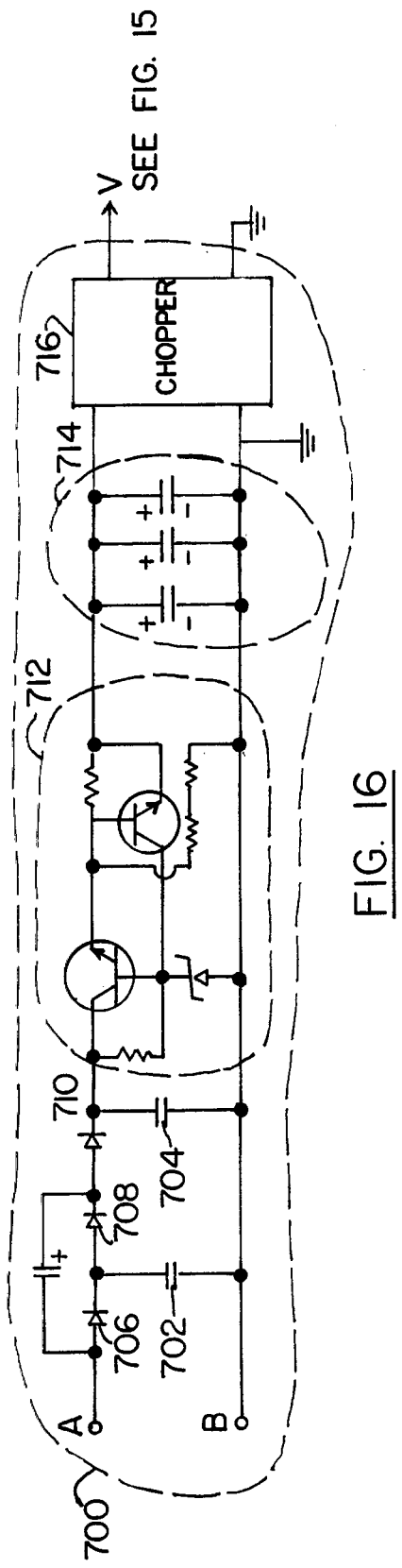
FIG. 16 is a diagram showing the circuitry for providing a high voltage programming input to the $R_x$ resistors of FIG. 15.
Figure 17:
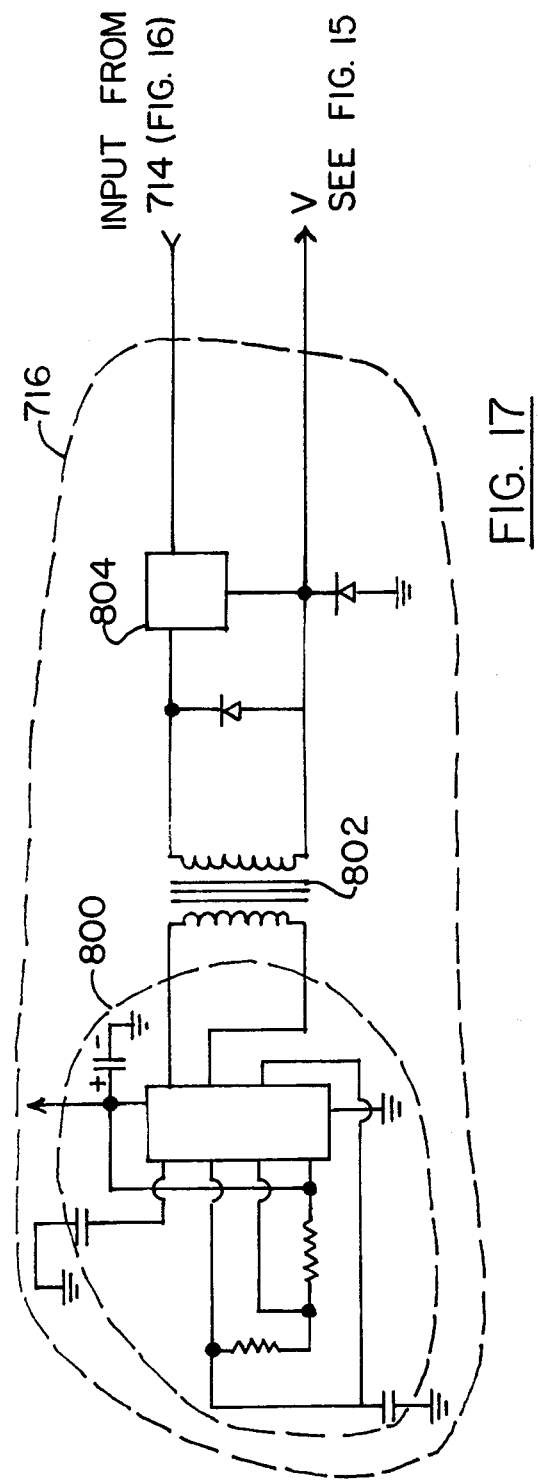
FIG. 17 is a circuit diagram showing a chopper circuit (716) for providing an on-off input to the $R_x$ resistors.

Referring to FIG. 16, circuitry 700 is shown which provides the high voltage V to the resistors $R_x$ to effect a blow open condition. Specifically, a lower voltage a.c. input is selectively rectified and amplified by means of (1) charging and discharging capacitors 702 and 704 through diodes 706, 708, and 710 and (2) passing the signal across capacitor 704 and via a transistor network 712 to storage capacitors 714. The storage capacitors 714 provide a substantially d.c. voltage to a chopper circuit 716 which is detailed in FIG. 17. The chopper circuit 714 includes a timer 800 (such as a 555 timer) which, through transformer 802, drives an on-off switch 804 which is illustrated as a TIP-142 having an appropriate chopped output waveform. The chopped output is selectively provided to each $R_x$ (see FIG. 15), each $R_x$ comprising resistive material deposited on a ceramic slab and covered by a protective epoxy film. To help assure that each resistor $R_x$ will blow open, a silicone cushion is interposed between each resistor $R_x$ and the epoxy film. The silicone cushion in each conventional blow open resistor $R_x$ is intended to absorb and hold the debris of the resistor $R_x$ after it is blown, or exploded. However, if a prolonged arc is applied to a resistor $R_x$, there is an unacceptable probability that the explosion during blowing will penetrate the silicone cushion and cause a closed rather than open condition. The chopped output provided by the invention decreases the likelihood of a destructive arc causing a closed circuit and increases the probability of proper blow open programming.

4. Alternative Embodiments

The invention as shown in FIGS. 5 through 15 does not represent the only embodiment contemplated. Variations, some of which are discussed below, are within the scope of the invention.

First, each scramble window pulse is described as "bracketing" (extending before, during and after) a corresponding horizontal sync pulse and each descramble window is described as wider than the scramble window. With precise timing and pulsewidth of the horizontal sync pulses, the scramble windows, and the descramble windows, these three types of pulses may coincide in pulsewidth. As a practical matter, however, the "bracketing" technique provides better results in that it accounts for variations in phase.

Second, attenuation and subsequent amplification by 6dB is only exemplary. The magnitude of signal reduction may be any level sufficient to imbed the horizontal sync pulses in the video information signal.

Third, the present invention does not require that all horizontal sync pulses outside the vertical blanking intervals be suppressed. The suppression of every odd horizontal sync pulse or of other selected combinations of suppressed horizontal sync pulses may prove sufficient to scramble a composite video signal. The descrambler would, of course, amplify in a pattern corresponding to the suppression pattern. With the timing outputs provided in FIG. 7A, the forming of such patterns are achievable in accordance with the invention.

Fourth, it should be noted that the scrambler 200 (of FIG. 5) may be separate hardware connectable to an existing television transmitter or may be an integral element of the transmitter. Similarly, the descrambler 202 may comprise a separate device or may be incorporated into a receiver set.

Fifth, regarding the insertion of flag pulses, it should be noted that a VIF between the 13th (538th) and 17th (542nd) half-lines and the defining of twelve time slots into which flags could be inserted were matters of choice. The VIF may also be before the vertical pulses and more or less time slots defined. The interval of the time slots should be limited by the width of the equalizing pulses. Such variations would require different timing inputs and, possibly, increased memory.

Sixth, the gate 528 receives a $\overline{V_{UNS}}$ and a DSW input. These two inputs, when gated alone, provide the time intervals during which horizontal sync pulses outside the unsuppressed intervals occur. By disconnecting the third input to gate 528, a simple descrambler which descrambles all scrambled signals from a sync suppression scrambler like scrambler 200 (of FIG. 5) results.

Seventh, it should be clear that the scrambling and descrambling can be used in combination with or separate from the flag identification process. When in combination, the sync suppression and flagging permits selected access to scrambled video broadcasts. Also, in combination, the scrambling and flagging operations are based on the same derived time reference from the timing generator 227 (see FIG. 14), thereby providing a time coordinated, economical system. Separately, the descrambler circuitry can descramble unflagged sync suppressed signals and the flag recognition circuitry can identify channels or transmissions on channels of unscrambled signals. While useable separately, the interfacing of the scrambling and flagging at various points (such as gates 520 and 528) to realized noise immunity and other unique benefits suggests the enhanced utility of the combination.

Eighth, the unsuppressed interval is generally standardized. It is thus contemplated that the invention may be practiced with any video broadcast system having a standard unsuppressed interval, provided that equalizing pulses, serrated pulses, and at least one field-identifying horizontal sync pulse (if necessary) are included in each unsuppressed interval.

Other improvements, modifications and embodiments will become apparent to one of ordinary skill in the art upon review of this disclosure. Such improvements, modifications and embodiments are considered to be within the scope of this invention as defined by the following claims.

We claim:

1. In a video communication system which provides an unscrambled composite video signal having a video information signal interrupted by (1) amplitude-detectable horizontal sync pulses occurring within a horizontal blanking interval which follows the scan of a horizontal line and (2) periodic sets of pulses, each such set including vertical sync pulses and occurring within a vertical blanking interval which follows the scan of a predetermined fixed number of horizontal lines, apparatus for limiting access by a receiver set to the video information contained within the video information signal of the unscrambled composite video signal, the apparatus comprising:

a scrambler having the unscrambled composite video signal as an input, the scrambler comprising:

amplitude modifying means for (a) reducing the amplitude of predetermined horizontal sync pulses to levels indistinguishable from the amplitude of the video information signal of the unscrambled composite video signal and (b) maintaining the amplitude of (1) at least some of the pulses occurring during each vertical blanking interval and (2) substantially all of the video information signal, the scrambler thereby providing a selectively suppressed scrambled composite video signal as an output; and a descrambler connected to receive the scrambled composite video signal as input, the descrambler comprising:

means for deriving the time intervals of the amplitude-reduced horizontal sync pulses from the amplitude-maintained pulses occurring within the vertical blanking intervals, said video communication constituting a system wherein each periodic set of pulses includes a fixed number of adjacent broad pulsewidth vertical sync pulses and a plurality of narrow pulsewidth equalizing pulses, the scrambler further comprising:

(a) means for determining a time period which contains a plurality of equalizing pulses, at least some of which are adjacent in time;

(b) means for dividing the intervals between at least two adjacent equalizing pulses in the determined time period into time slots; and (c) flagging means for selecting one of a plurality of broadcast identifier flags and for generating a flag pulse during one of the time slots, the flag pulse in the time slot corresponding to the selected identifier flag, said flagging means further comprising:

means for inserting the generated flag pulses into the selectively suppressed composite video signal when (a) the flag pulse occurs during a preselected time slot between two equalizing pulses, (b) the preselected time slot occurs during the determined time period, and (c) the determined time period occurs within a fixed relative time interval during each vertical blanking interval, said flag inserting means further comprising:

modulator means for effecting a relative increase in the selectively suppressed scrambled composite video signal during the presence of an inserted flag pulse, said time interval deriving means comprising:

means for producing a reference pulse at substantially the same relative time during each vertical blanking interval, said reference pulse producing means comprising:

(a) means for integrating the vertical sync pulses;

(b) means for comparing the output of the integrating means with a threshold level which is less than the maximum output integrated by the integrating means; and (c) means for signalling when the output of the integrating means exceeds the threshold level, (d) means, receiving the scrambled composite video signal as input, for providing a pip signal in response to either only the rising edge or falling edge of each pulse in the srambled video signal; and (e) means, having as inputs the output of the pip signal providing means and the output of the integrating means, for generating a pulse output when a pip from the pip providing means is first provided after the signalling means indicates that the threshold level has been exceeded.

2. A video communication system according to claim 1 wherein the reference pulse producing means further comprises:

a flip-flop connected to the output of the signalling means and to the output of the pip providing means, the flip-flop (1) being set to a first state in response to the signalling means indicating that the threshold level has been exceeded and (2) receiving a reset input in response to a pip signal received from the pip differentiating means, the flip-flop providing a reference pulse when the flip-flop is reset after being set.

3. A video communication system according to claim 2 wherein the reference pulse producing means further comprises:

means for adjusting the threshold level of the comparing means.

* * * * *